United States Patent
Udaka et al.

(10) Patent No.: US 6,219,173 B1
(45) Date of Patent: Apr. 17, 2001

(54) OPTICAL DEVICE AND ITS MANUFACTURING METHOD

(75) Inventors: Tooru Udaka, Kanagawa; Hideharu Miyagaki, Chiba; Shinichiro Yamada; Hiroshi Imoto, both of Kanagawa; Masaru Kawabata, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/155,472

(22) PCT Filed: Jan. 30, 1998

(86) PCT No.: PCT/JP98/00410

§ 371 Date: Jul. 6, 1999

§ 102(e) Date: Jul. 6, 1999

(87) PCT Pub. No.: WO98/34153

PCT Pub. Date: Aug. 6, 1998

(30) Foreign Application Priority Data

Jan. 31, 1997 (JP) .................................................. 9-018471
Jan. 21, 1998 (JP) ................................................. 10-009458

(51) Int. Cl.[7] ..................................................... G02F 1/153
(52) U.S. Cl. .......................... 359/272; 359/270; 359/273; 359/275; 427/125
(58) Field of Search .................................. 359/272, 273, 359/269, 270, 275; 427/125

(56) References Cited

U.S. PATENT DOCUMENTS

| 4,365,634 | * | 12/1982 | Bare et al. ............................ 128/640 |
| 4,793,695 | * | 12/1988 | Wada et al. ........................... 350/357 |
| 5,764,401 | * | 6/1998 | Udaka et al. .......................... 359/270 |
| 5,864,420 | * | 1/1999 | Udaka et al. .......................... 359/270 |
| 5,880,872 | * | 3/1999 | Udaka .................................. 359/273 |
| 6,019,955 | * | 2/2000 | Ovshinsky et al. ................... 423/592 |
| 6,042,933 | * | 3/2000 | Hirai et al. ............................ 428/209 |

FOREIGN PATENT DOCUMENTS

| 404233210 | * | 8/1992 | (JP) . |
| 8-136957 | | 5/1996 | (JP) . |
| 8-262501 | | 10/1996 | (JP) . |
| PCT 96/41233 | | 12/1996 | (JP) . |
| PCT 98/14825 | | 4/1998 | (JP) . |

* cited by examiner

*Primary Examiner*—Georgia Epps
*Assistant Examiner*—Tim Thompson
(74) *Attorney, Agent, or Firm*—Sonnenschein, Nath & Rosenthal

(57) ABSTRACT

An optical apparatus having counter electrodes of ITO and working electrodes formed from a conductive paste prepared by dispersing silver or carbon conductive particles in a binder or a sintered material obtained by sintering silver or carbon conductive particles. The counter electrodes can be formed into a structure free of sharp edges which can cause a concentration of electric fields.

56 Claims, 15 Drawing Sheets

US 6,219,173 B1

OPTICAL DEVICE AND ITS MANUFACTURING METHOD

TECHNICAL FIELD

BACKGROUND OF THE INVENTION

The present invention relates to an optical apparatus, and a manufacturing method therefor, for use in, for example, a reflection type display unit which uses deposition/dissolution of metal and which is employed in place of an electrochromic display unit to display characters or numerics or an X-Y matrix display or the like and in an optical filter which is capable of controlling light transmittance in a visible light region (wavelength 1=400 nm to 700 nm).

Hitherto, an electrochromic device (hereinafter called an "ECD") which has been employed in a digital clock or the like is a non-luminous display unit using reflected light or transmitted light. Therefore, an advantage can be obtained in that fatigue can be prevented even if observation is performed for a long time. Moreover, advantages can be obtained in that a relatively low operating voltage is required and power consumption can be reduced. For example, a liquid ECD disclosed in Japanese Patent Laid-Open No. 59-24879 has been known, the foregoing liquid ECD being composed of an EC material which is an organic viologen molecule derivative which reversibly realizes a coloring/decoloring state.

However, the ECD composed of the viologen molecule derivative has a problem of unsatisfactorily low response speed and an insufficient shielding characteristic.

Therefore, a reflection type dimmer using deposition/dissolution of metal salts has attracted attention in place of the ECD. Thus, an electrochemical dimmer using deposition/dissolution of silver has been researched and developed.

FIGS. 13A, 13B and 14 show the structure of a cell of the foregoing conventional electrochemical dimmer.

As shown in FIGS. 13A and 14, a pair of transparent glass substrates 24 and 25 serving as display windows are disposed apart from each other for a predetermined distance. As shown in FIG. 13A, opposite working electrodes 22 and 23 made of ITO (Indium Tin Oxide prepared by doping tin into indium oxide) are disposed on the inner surfaces of the substrates 24 and 25. Silver-salt solution 21 is placed between the opposite working electrodes 22 and 23. Reference numeral 26 represents a counter electrode in the form of a silver plate disposed between the outer peripheries of the substrates 24 and 25 and also serving as a spacer.

The silver-salt solution 21 is prepared by dissolving silver bromide in dimethyl sulfoxide (DMSO). As shown in the drawing, the counter electrode 26 is disposed as an anode and the working electrodes 22 and 23 are disposed as a cathode. When a DC operating voltage is applied between the cathode and anode for a predetermined time, the following oxidation-reduction reactions occur on the cathode:

$Ag^+ + e^- \rightarrow Ag$

The obtained deposits of Ag cause the working electrodes 22 and 23 serving as the cathode to be converted from a transparent state to a coloring state. FIG. 13B is a diagram showing the principle of the above-mentioned phenomenon.

Since Ag is deposited on the working electrodes 22 and 23 as described above, specific color (for example, reflected light) caused from the deposited Ag can be observed through the display window. The filtering effect caused from coloring, that is, the transmittance of visible light (the depth of color) is changed in accordance with the level of the voltage or time for which the voltage is applied. Therefore, control of the voltage or the time enables the foregoing cells to act as the transmittance-variable display devices or optical filters.

When a DC voltage is applied between the counter electrode 26 and the working electrodes 22 and 23 in a direction opposite to the above-mentioned process, the working electrodes 22 and 23, on which Ag has been deposited, serve as an anode. Thus, the following reactions occur:

$Ag \rightarrow Ag^+ + e^-$

As a result, Ag deposited on the working electrodes 22 and 23 is dissolved in the silver-salt solution 21. Thus, the state of the colored working electrodes 22 and 23 is changed from the colored state to a transparent state.

FIGS. 15 and 16 show another electrochemical dimming device. In this example, a pair of transparent glass substrates 4 and 5 forming a cell are disposed apart from each other by a predetermined distance as shown in FIG. 15 which is a cross sectional view. Pairs of working electrode 2a, 2b, 2c, 2d and 2e and 3a, 3b, 3c, 3d and 3e each of which is made of ITO and which are disposed opposite to one another are formed on the inner surfaces of the substrates 4 and 5. Counter electrodes 7a and 7b in the form of silver plates are disposed on the outer peripheries of the working electrodes 2a to 2e and 3a to 3e. The substrates 4 and 5 are disposed apart from each other by a predetermined distance by a spacer 6. Silver-salt solution 1 is enclosed between the substrates 4 and 5.

As shown in FIG. 16 which is a plan view, the working electrodes 2a to 2e and 3a to 3e and the counter electrodes 7a and 7b are formed into a concentric pattern. The electrodes 2a and 3a, 2b and 3b, 2c and 3c, 2d and 3d, 2e and 3e and 7a and 7b are connected to operating power sources 8a, 8b, 8c, 8d, 8e and 8f through electric lines 9a, 9b, 9c, 9d, 9e and 9f in the form of thin chrome wires.

When predetermined potentials ($V_1$, $V_2$, $V_3$, $V_4$ and $V_5$, while $V_6$ is a referential potential at the counter electrodes 7a and 7b) are applied between opposite working electrodes 2a and 3a, 2b and 3b, 2c and 3c, 2d and 3d and 2e and 3e, silver can be deposited from the silver-salt solution 1 on each electrode which is the cathode. Thus, color can be developed. The transmittance of visible light (or the density of color) is changed in accordance with the level of the voltage or time for which the voltage is applied.

When the voltages are made such that $V_1 = V_2 = V_3 = V_4 = V_5$, color can be developed in the overall region of the cell. Moreover, the density can uniformly be changed in accordance with the voltage or the time for which the voltage is applied. When the voltages are made such that, for example, $|V_1| < |V_2| < |V_3| < |V_4| < |V_5|$, the density of the color is raised from the center to the periphery (that is, the transmittance is reduced). When the voltages are made such that $|V_1| > |V_2| > |V_3| > |V_4| > |V_5|$, the transmittance is enlarged from the center to the periphery. The above-mentioned structure is effective to serve as an optical diaphragm for a CCD (Charge Coupled Device) for a TV camera or the like. The structure is able to sufficiently raise the density of integration of the CCD.

The above-mentioned electrochemical dimming device has a problem that the cost cannot be reduced because raw metal plates, such as the raw silver plates, are employed as it is to serve as the counter electrodes, 7a, 7b and 26. Since the lifetime of the device has been enlarged, there arises another problem in that silver particles inactivated and deposited on the counter electrode float in the silver-salt solution. Thus, the inside portion of the device is contaminated, causing the transmittance, which is realized when the device is in the transparent state, to deteriorate. Moreover, the electrodes are short-circuited.

When decoloring of the working electrodes of the device shown in FIGS. 15 and 16 is performed, silver is deposited on the counter electrodes 7a and 7b which are the cathode. At this time, electric lines of force of the electric field are concentrated to sharp portions of the electrodes, as shown in FIG. 17 (for example, 7b is shown). It leads to a fact that silver is enlarged into grains each having a relatively large size and deposited in the foregoing portions. The granular silver A is, differently from silver B in the form of a thin film, not easily be dissolved when color is developed on the working electrodes. Therefore, the silver A is separated and allowed to float in the silver-salt solution 1 while the granular and inactive state is maintained. If the inactive silver particles are increased in the silver-salt solution, the transparency of the device deteriorates when decoloring is performed on the working electrodes. What is worse, the silver particles cause the electrodes to be short-circuited.

SUMMARY OF THE INVENTION

An object of the present invention is to provide an optical apparatus, such as an electrochemical dimming device, having a structure which enables the counter electrode of the electrochemical dimming device using deposition/dissolution reactions of silver to be made of a relatively low-cost material and which is able to prevent formation of inactive silver particles on the counter electrode, and a manufacturing method therefor.

Another object of the present invention is to provide an optical apparatus which is capable of stabilizing the potential of the counter electrode and thus stably operating, and a manufacturing method therefor.

An optical apparatus according to a first embodiment of the present invention comprises: a pair of electrodes; silver-salt solution placed in contact with the pair of electrodes at a position between the pair of electrodes, wherein at least the surface of either of the pair of electrodes contains at least one type of conductive particles and at least one type of a binder.

When the optical apparatus according to the first embodiment of the present invention is manufactured, it is advantageous if a method is employed which comprises the step of: printing or applying a mixture containing at least one type of conductive particles and at least one type of binder so that at least the surface of either of the pair of electrodes is formed.

An optical apparatus according to a second embodiment of the present invention comprises: a pair of electrodes; and silver-salt solution placed in contact with the pair of electrodes between the pair of electrodes, wherein at least the surface of either of the pair of electrodes is formed by sintering at least one type of conductive particles.

The present invention has a structure such that at least the surface of the electrode of an optical device, such as an electrochemical dimming device, using deposition/dissolution of silver is formed by the mixture of the conductive particles and the binder or the material obtained by sintering the conductive particles. Therefore, the cost of the material of the electrodes can be reduced as compared with the structure in which the overall body of the electrodes are made of metal plates or the like.

Since the counter electrode can be made to be substantially free from edges, local concentration of electric fields on the counter electrode can be relaxed. As a result, deposition of inactive and granular silver on the counter electrode can be reduced or prevented. As a result, floating of the inactive silver particles in the silver-salt solution which causes the transparency of the device to deteriorate and shortcut to take between the electrodes can be prevented.

BRIEF DESCRIPTION OF THE DRAWINGS

These and other features and aspects of the invention will become clear in the following detailed description of a few typical exemplary embodiments with reference to the accompanying drawings.

DETAILED DESCRIPTION OF THE PRESENTLY PREFERRED EMBODIMENTS

Figure 1:
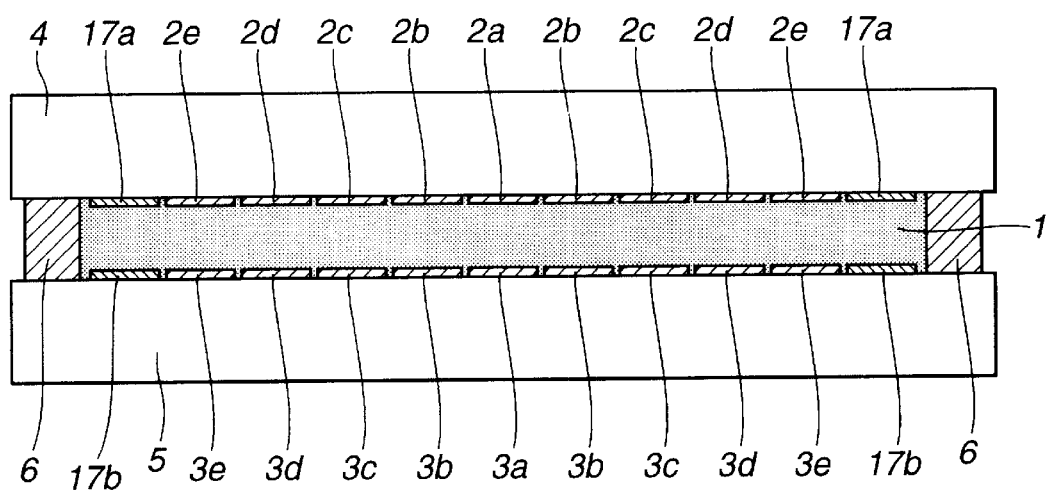
FIG. 1 is a cross sectional view showing the structure of an optical filter according to first and second embodiments of the present invention.

It is preferable that a first optical apparatus according to the present invention has the structure that conductive particles are made of at least one type of a material selected from a group consisting of silver and carbon materials. Moreover, it is preferable that a binder is made of one type of resin selected from a group consisting of natural rubber resin, cellulose resin, phenol resin, urethane resin and epoxy resin. It is preferable that at least the surface of either of the electrodes is formed by silver particles, the conductive particles and the binder. It is preferable that at least the surface of either of the electrodes is formed by printing or applying a mixture of the above-mentioned materials.

In the above-mentioned case, it is preferable that the silver particles are added at a weight ratio of 0.01 time to 100 times a component composed of the conductive particles, except for the silver particles and the binder to stabilize the potential of either of the electrodes and to easily prepare the mixture. It is preferable that the quantity of addition is 0.05 time to 10 times (which is applied hereinafter).

Specifically, the silver particles are added at a weight ratio of 0.01 time to 100 times (more preferably, 0.05 time to 10 times) the solid component of paste composed of the conductive particles, except for the silver particles and the binder.

That is, the optical apparatus according to the present invention has the structure that the counter electrode (either of the electrodes) is made of a material obtained by causing the conductive particles to be contained in the binder. Thus, the cost can be reduced, the transparency of the device can be improved and occurrence between the electrodes can be prevented. As for the spectral characteristics which are considered to be determined in accordance with the operating voltage for the device, it can be considered that the spectral characteristics can be improved when the material of the counter electrode is changed. When the counter electrode is formed by causing the conductive particles to be contained in the binder or the conductive particles are sintered, silver is introduced into the counter electrode during the operation. Thus, a potential different from that of the silver plate is realized. Since the counter electrode is made of a material which is chemically instable (since silver is deposited and the composition of the counter electrode is therefore changed), control and operation sometimes encounter difficulty.

However, when at least the surface of either of the electrodes is formed by the silver particles which are, together with other conductive particles, added to the binder (or by adding conductive particles plated with silver or evaporated with silver to the binder or by sintering, the conductive particles, as described later) (that is, when silver is added to the foregoing electrode), the potential of the electrode can be stabilized.

When the silver particles are added to the paste composed of the conductive particles and the binder in a state in which the potential of either of the electrodes is different from that of the silver electrode by a positive value or a negative value of 50 mV or more, a satisfactory effect can be obtained. If the potential of either of the electrodes is different from that of the silver electrode by |50 mV| or greater, deposition and dissolution of silver cannot easily take place. Therefore, the foregoing silver particles are added (or the conductive particles plated with silver or evaporated with silver) so that the potential of the electrode is made to be the same as that of the silver electrode or a potential with which deposition and dissolution of silver easily take place (applied here in after).

At least the surface of either of the electrodes may be formed by the conductive particles except for silver used in silver plating or silver evaporation and the binder. The surface may be formed by printing or applying the obtained mixture.

Also in this case, it is preferable that silver which is plated or evaporated is added at a weight ratio of 0.01 time to 100 times (more preferably 0.05 time to 10 times) the component composed of the conductive particles, except for silver and the binder, because of the above-mentioned reason.

Specifically, silver which is plated or evaporated is added at a weight ratio of 0.01 time to 100 times (more preferably 0.05 time to 10 times) the solid component of paste composed of the conductive particles, except for silver and the binder.

It is preferable that at least the surface of either of the electrodes is formed by printing or applying paste obtained by mixing the silver-plated or silver-evaporated conductive material except for silver with the binder after the conductive material has been pulverized.

It is preferable that the conductive particles plated with silver or evaporated with silver is added to the binder when the potential of either of the electrodes is different from the potential of the silver electrode by a positive value or a negative value of 50 mV or greater.

It is preferable that the second optical apparatus according to the present invention has the structure that the conductive particles are made of one type of a material selected from a group consisting of silver and carbon materials.

To stabilize the potential of the electrode, it is preferable that at least the surface of either of the electrodes is formed by a sintered layer composed of silver particles and the conductive particles except for silver. Moreover, it is preferable that the sintered layer is formed when the potential of either of the electrodes is different from the potential of the silver electrode by a positive value or a negative value of 50 mV or greater.

At least the surface of either of the electrodes may be formed by a sintered layer composed of the silver-plated or silver evaporated conductive particles except for silver.

In this case, at least either of the electrodes may be formed by previously forming the silver-plated or silver-evaporated conductive material except for sintered layer after the conductive material has been pulverized and by sintering the conductive material.

It is preferable that the conductive material is sintered after the conductive material has been pulverized and previously molded in a case where the potential of either of the electrodes is different from the potential of the silver electrode by a positive value or a negative value of 50 mV or greater.

The first optical apparatus, the manufacturing method therefor and the second optical apparatus according to the present invention have a structure that either of the electrodes is formed by a first conductive layer containing the conductive particles and the binder or by sintering the conductive particles and a second conductive layer (a collector) formed below the first conductive layer.

In this case, the second conductive layer may be formed by metal foil or a thin conductive film. For example, the second conductive layer may be made of the same material as that of the other electrode of the pair of the electrodes.

It is important that the ends of either of the electrodes must be substantially free from any edge.

The structure of the optical apparatus comprises a pair of transparent or semi-transparent substrates disposed opposite to each other; at least a pair of transparent or semi-transparent electrodes each of which is provided for each of the opposite surfaces of the pair of the transparent or semi-transparent substrates; the silver-salt solution placed between the at least pair of the transparent or semi-transparent electrodes in a contact manner; and the counter electrode disposed in contact with the silver-salt solution and containing the conductive particles and the binder or formed by sintering the conductive particles.

In the foregoing case, the transparent or the semi-transparent electrode may be made of indium-tin oxide.

Embodiments of the present invention will now be described.

First Embodiment

Figure 15:
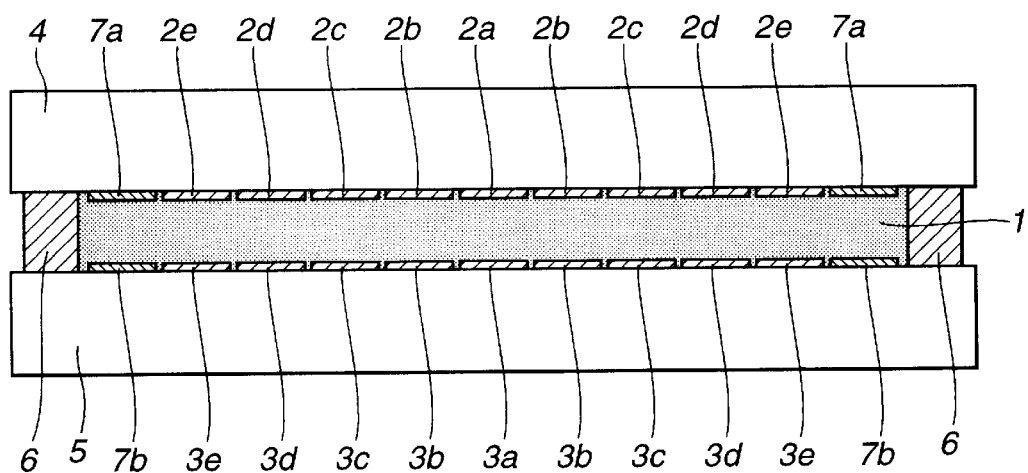
FIG. 15 is a cross sectional view showing another conventional electrochemical dimming device.
Figure 16:
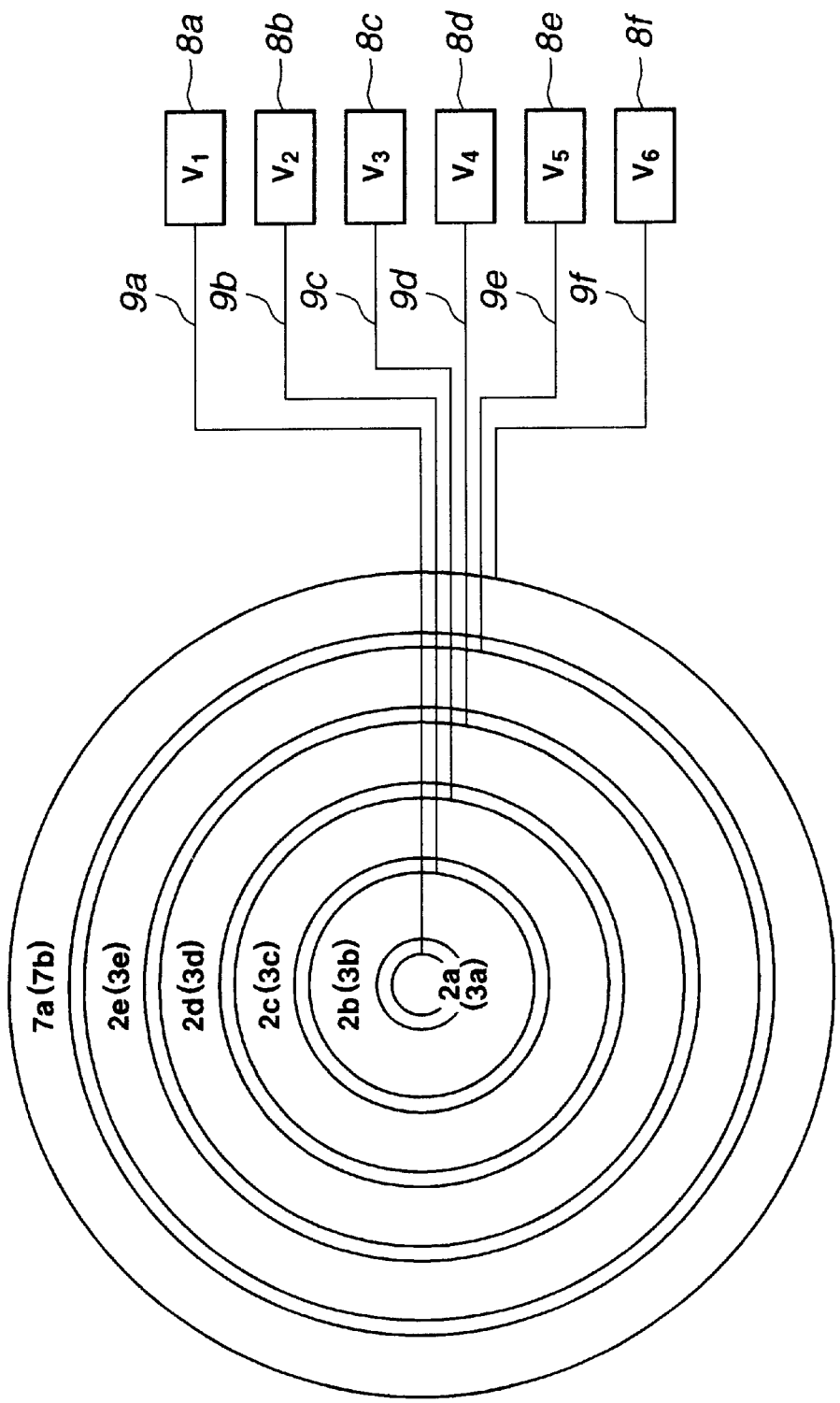
FIG. 16 is a schematic plan view showing the device shown in FIG. 15.

Referring to FIG. 1, a first embodiment of the present invention having a structure that the present invention is applied to an optical apparatus (an electrochemical dimming device) similar to that described with reference to FIGS. 15 and 16 will now be described.

The first embodiment, as shown in the drawing, has a structure that a pair of transparent substrates (for example, glass substrates) 4 and 5 forming a cell are disposed apart from each other for a predetermined distance. Moreover, pairs of working electrodes (for example, ITO electrodes) 2a, 2b, 2c, 2d and 2e and 3a, 3b, 3c, 3d and 3e disposed opposite to each other are formed on the inner surfaces (the opposite surfaces) of the substrates 4 and 5. A spacer 6 maintains a predetermined distance between the substrates 4 and 5. Silver-salt solution 1 is enclosed between the substrates 4 and 5.

In the first embodiment, counter electrodes 17a and 17b which are disposed on the outer peripheries of the working electrodes 2a to 2e and 3a to 3e are formed as follows: one type of conductive coating material in the form of paste prepared by mixing the conductive particles and the binder is printed or applied to the substrates 4 and 5 so that the counter electrodes 17a and 17b are formed. Note that the planar shapes of the working electrodes 2a to 2e and 3a to 3e and the counter electrodes 17a and 17b are substantially the same as those shown in FIG. 16.

At this time, the conductive particles may be silver or another metal material, such as copper or nickel, or an alloy of the foregoing metal material or a carbon material, such as graphite, hard carbon, soft carbon, carbon black or active carbon or their mixture. It is preferable that the particle size of the conductive particles is several mm to tens of mm. If the particle size is smaller or larger than the above-mentioned range, the conductive particles cannot uniformly be dispersed in the binder. In this case, the electric resistance of the film is raised excessively.

The hard carbon is a carbon material which is not graphitized even if it is subjected to heat treatment at about 3000° C. The soft carbon is a carbon material which is graphitized when it is subject to heat treatment at about 2800° C. to about 3000° C.

As a starting material for preparing the hard carbon material, it is preferable that the material is furan resin composed of homopolymer or copolymer of furfuryl alcohol or furfural. The reason for this lies in that the carbon material composed of the furan resin has a structure that the distance between (002) planes is 0.37 nm or longer, the true density is 1.70 g/cc or lower and the carbon material has no oxidation heat generation peak at 700° C. or higher as a result of differential thermal analysis (DTA).

As another starting material, an organic material of a type prepared by introducing (by so-called oxygen-crosslinking) functional groups containing oxygen into petroleum pitch having a specific H/C atom ratio may be employed. The reason for this lies in that the foregoing organic material can be converted into a carbon material having excellent characteristics when it is carbonized.

The petroleum pitch may be prepared from tar or asphalt which can be obtained from high-temperature heat decomposition of coal tar, ethylene bottom oil or crude oil by distillation (vacuum distillation, atmospheric distillation or steam distillation), heat polycondensation, extraction, chemical polycondensation or the like. At this time, the H/C atom ratio of the petroleum pitch is an important factor. To form the hard carbon, the H/C atom ratio must be 0.6 to 0.8.

A means for introducing the functional groups containing oxygen into the petroleum pitch is not limited specifically. For example, any one of the following methods may be employed: a wet method using water solution of, for example, nitric acid, mixed acid, sulfuric acid or hypochlorous acid; a dry method using oxidizing gas (air or oxygen); and reactions using a solid reagent, such as sulfuric acid, ammonium nitrate, ammonia persulfate, ferric chloride or the like.

When the functional groups containing oxygen are introduced into petroleum pitch, a final carbon material in a solid phase can be obtained without melting, during the carbonizing process (at about 400° C.). The foregoing, process is similar to a process for generating the hard carbon.

The petroleum pitch into which the functional groups containing oxygyen by the above-mentioned method are introduced is carbonized so that a material for the electrode is obtained. Note that the carbonizing condition is not limited particularly. In this process, the following condition is required: the distance between (002) planes is 0.37 nm or longer, the true density is 1.70 g/cc or lower and the carbon material has no oxidation heat generation peak at 700° C. or higher as a result of differential thermal analysis (DTA). When the content of oxygen of a precursor obtained by oxygen-crosslinking, the petroleum pitch is made to be 10 wt % or higher, the distance of (002) planes of the carbon material which will be generated can be made to be 0.37 nm or longer. Therefore, it is preferable that the content of oxygen which is contained in the precursor is 10 wt % or higher. A practically preferred content must satisfy the 10 wt %–20 wt % range.

As the organic material with which the oxygen crosslinking is performed, the organic material must have a H/C atom ratio of 0.6 to 0.8. An organic material may be employed which can be prepared by subjecting any one of the following starting materials to previous heat treatment, such as a process for obtaining pitch. The starting material may be any one of the following materials: an organic polymer compound, such as phenol resin, acrylic resin, halogenated vinyl resin, polyimide resin, polyamideimide resin, polyamide resin, conjugate resin, cellulose or its derivative; a condensed polycyclic hydrocarbon compound, such as naphthalene, phenanthrene, anthracene, triphenylene, pyrene, perylene, pentaphene or pentacene; another derivative (for example, its carboxylic acid, carboxylic anhydride, carboxylic imide or the like), a variety of pitch materials containing a mixture of the foregoing compounds as a main component thereof; and a condensed heterocyclic compound, such as acenaphthylene, indole, isoindole, quinoline, isoquinoline, quinoxaline, phthalazine, carbazole, acridine, phenazine, phenantolidine, and its derivative.

The representative organic material serving as the starting material for the soft carbon is coal or pitch.

The pitch may be prepared from tar or asphalt which can be obtained from high-temperature heat decomposition of coal tar, ethylene bottom oil or crude oil by distillation (vacuum distillation, atmospheric distillation or steam distillation), heat polycondensation, extraction, chemical polycondensation or the like. Pitch which is generated when wood is dry-distillated may be employed.

The polymer compound material may be polyvinyl chloride resin, polyvinyl acetate resin, polyvinyl butyrate resin or 3, 5-dimethylphenol resin.

Each of the starting materials exists in a liquid form at about 400° C. or lower during the carbonizing process. When the starting material is maintained at the foregoing temperature, aromatic rings are condensed and formed into polycyclic shape. Thus, the aromatic rings are laminated and oriented. When the temperature is raised to about 500° C., solid carbon precursor, that is, semicoke is formed. The above-mentioned process is called a "liquid-phase carbonizing process" which is a typical process for generating soft carbon.

As a matter of course, the materials of the coal, the pitch and the polymer compound is subjected to the above-mentioned liquid-phase carbonizing process when carbonization is performed.

The starting material may be a condensed polycyclic hydrocarbon compound, such as naphthalene, phenanthrene, anthracene, triphenylene, pyrene, perylene, pentaphene or pentacene; another derivative (for example, its carboxylic acid, carboxylic anhydride, carboxylic imide or the like), a variety of pitch materials containing a mixture of the foregoing compounds as a main component thereof; and a condensed heterocyclic compound, such as acenaphthylene, indole, isoindole, quinoline, isoquinoline, quinoxaline, phthalazine, carbazole, acridine, phenazine, phenantolidine, and its derivative.

When the carbon material is obtained by using the organic raw material, carbonization is performed at 300° C. to 700° C. in a nitrogen flow. Then, sintering is performed in a nitrogen flow at a temperature rising rate of 1° C. to 20° C./minute such that the temperature is raised to 900° C. to 1300° C. for 0 to 5 hours at the raised temperature. As a matter of course, the carbonizing process may be omitted.

A phosphorus compound may be added to the starting material for the hard carbon or the soft carbon or the precursor before the carbonization and sintering is performed.

When the conductive particles according to the present invention are composed of graphite, natural graphite or artificial graphite may be employed which can be prepared by using the soft carbon as precursor and by subjecting the precursor to heat treatment at a high temperature of 2000° C. or higher.

The following table shows results of comparisons of characteristics of graphite, soft carbon, hard carbon and active carbon.

| Type of Carbon | Crystal-linity | Density | Ratio of Vacancy | Sintering Temperature | Conductivity |
| --- | --- | --- | --- | --- | --- |
| Graphite | High | High | Low | High | High |
| Soft Carbon | ↓ | ↓ | ↑ | ↓ | ↓ |
| Hard Carbon | ↓ | ↓ | ↑ | ↓ | ↓ |
| Active Carbon | Low | Low | High | Low | Low |

The binder according to the present invention and arranged to be mixed with the conductive particles must has resistance against the silver-salt solution 1. For example, the binder may be made of natural rubber, a cellulose material, urethane resin or epoxy resin. It is preferable that the mixture ratio of the binder and the conductive particles satisfies a range of weight ratio between about 80:20 to about 99:1, more preferably about 90:10 to about 99:1. If the mixture ratio is lower than 80:20, there is apprehension that the strength of the formed becomes unsatisfactory. If the mixture ratio is higher than 99:1, the conductive particles relatively increase. Thus, there is apprehension that required conductivity cannot be obtained.

Since the counter electrodes 17a and 17b are made of the mixture of the conductive particles and the binder as described above, the cost of the material can be reduced as compared with the conventional structure that counter electrodes is manufactured by metal plates, such as silver plates.

Figure 2A:
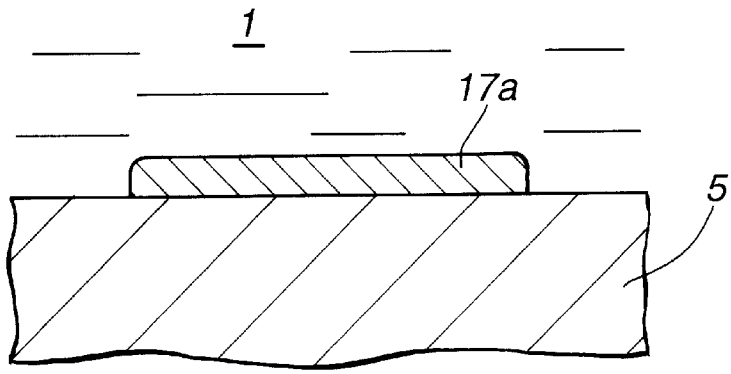
FIGS. 2A and 2B are enlarged cross sectional views showing a counter electrode of the optical filter according to the first and second embodiments of the present invention.
Figure 2B:
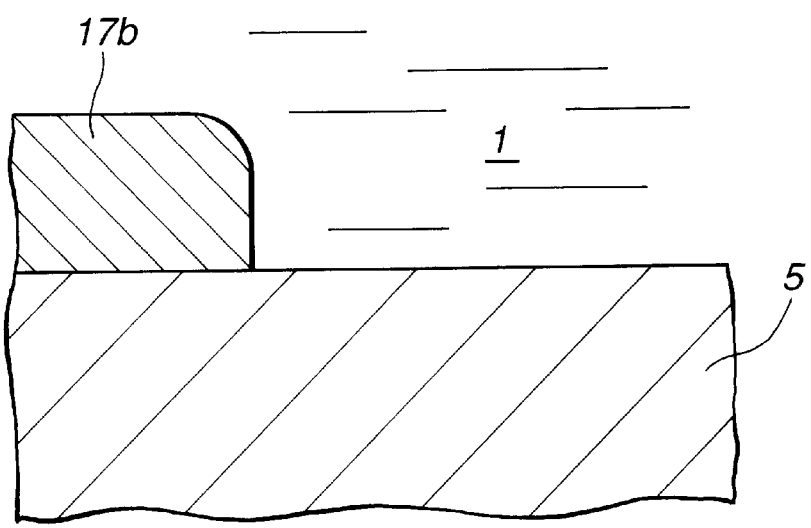
Figure 17:
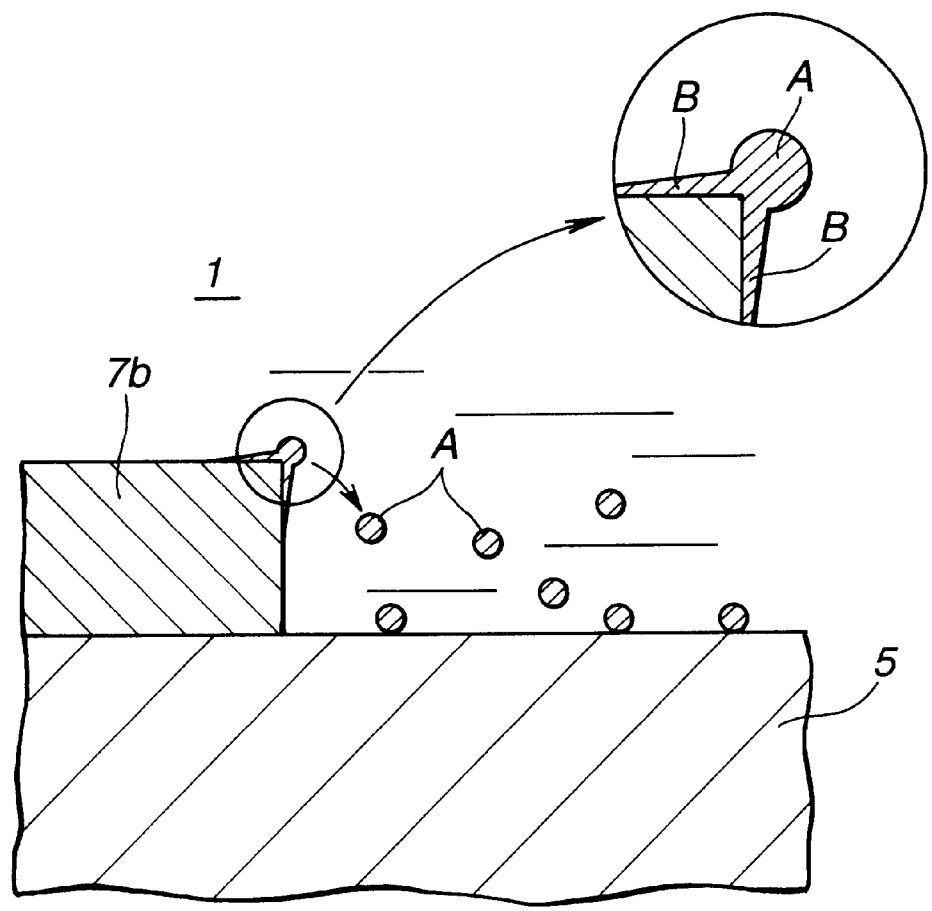
FIG. 17 is a schematic view showing problems experienced with the conventional device.

If the counter electrodes 17a and 17b are manufactured by printing or applying the paste type material similarly to the first embodiment, the edges of the end portions of the counter electrodes can be rounded because of the fluidity and the surface tension of the material as shown in FIG. 2A which is a partially-enlarged view showing the counter electrode 17b and FIG. 2B which is an enlarged view of the foregoing portion of the counter electrode 17b. As a result, the counter electrodes 17a and 17b substantially free from edges can be formed. Therefore, the concentration of electric fields as described with reference to FIG. 17 can be relaxed. As a result, formation of relatively large particles of silver deposited from the silver-salt solution 1 can be prevented. Thus, the first embodiment is able to prevent formation of inactive silver particles on the counter electrodes 17a and 17b which float in the silver-salt solution 1 and which deteriorate the transparency of the device when decoloring of the working electrode is performed and which cause the electrodes to be short-circuited.

The silver-salt solution 1 according to the first embodiment may be solution prepared by dissolving silver halide, such as silver bromide, silver chloride or silver iodide in water or nonaqueous solvent. The nonaqueous solvent may be dimethylsulfoxide (DMSO), dimethylformamide (DMF), diethylformamide (DEF), N, N-dimethylacetoamide (DMAA), N-methylpropionate amide (MPA), N-methylpyrolidone (MP), propylenecarbonate (PC), acetonitril (AN), 2-methoxyethanol (MEOH), 2-ethoxyethanol (EEOH) or the like.

It is preferable that the concentration of the silver halide in the silver-salt solution is 0.03 mol/l to 2.0 mol/l, preferably 0.05 mol/l to 2.0 mol/l.

To improve the conductivity of the silver-salt solution and to easily dissolve silver halide, it is preferable that support salt (supporting electrolyte) capable of supplying halogen, such as bromine and so forth, is added. For example, sodium halide, potassium halide, calcium halide, halogenated quaternary ammonium salt or the like may be employed. It is preferable that the supporting salt is added in a density ratio from ½ time to 5 times. When, for example, the ITO electrode, which is the working electrode for depositing or dissolving silver is physically modified, the deposition potential of silver on the ITO electrode can be lowered, deposition of silver can easily be performed and electrical damage of the ITO electrode and the solution can be prevented.

It is preferable that the chemical modification is surface treatment (chemical plating) of the ITO electrode which is performed with palladium obtained by a two-part processing method of tin solution and palladium solution. That is, when palladium cores are deposited on the sole ITO substrate as a process for activating the surface of the ITO electrode with palladium, the activity on the surface of the ITO electrode can be improved.

The tin solution may be solution prepared by dissolving 0.10 g to 1.0 g tin chloride ($SnCl_2$) in 1 liter HCl at a concentration of 0.010% to 0.10%. The palladium solution may be solution prepared by dissolving 0.10 g to 1.0 g palladium chloride ($PdCl_2$) in 1 liter HCl at a concentration of 0.010% to 0.10%.

The physical modification method may be a method with which metal or the like which is more noble than silver is evaporated on the ITO electrode.

Second Embodiment

A second embodiment of the present invention will now be described. Since the structure of the device according to the second embodiment is substantially the same as that according to the first embodiment shown in FIGS. 1 and 2, also the second embodiment will now be described with reference to FIGS. 1 and 2.

The second embodiment has an arrangement that the counter electrodes 17a and 17b are formed by sintering the conductive particles. The other structures are the same as those according to the first embodiment.

Similarly to the first embodiment, the conductive particles may be metal, such as silver or other metal or an alloy or a carbon material, such as graphite, soft carbon, hard carbon, carbon black, active carbon or their mixture. It is preferable that the particle size of the conductive particles is several mm to tens of mm. If the particle size is smaller than the above-mentioned range, the quantity of the conductive particle is relatively enlarged with respect to a required thickness of the film. Thus, there is apprehension that the cost cannot be reduced. If the particle size is larger than the above-mentioned range, vacancies in the film obtained by sintering are enlarged excessively. In this case, the mechanical strength of the film is reduced or the electric resistance is excessively raised.

When satisfactory mechanical strength can be obtained by sintering in the second embodiment, mixing of the binder with the conductive particles can be omitted. As a matter of course, binder may be mixed before the mixing process is performed. In this case, the binder may be the binder according to the first embodiment.

The second embodiment has the structure that the counter electrodes 17a and 17b are formed by sintering the conductive particles, such as metal or the carbon material after they have been previously molded. Then, the counter electrodes 17a and 17b are secured to the substrate by bonding or the like. Therefore, the quantity of the material can be reduced as compared with a structure that the counter electrodes are formed by closed-packed metal plates or the like. As a result, the cost of the material of the counter electrodes 17a and 17b can be reduced.

The shape of each of the counter electrodes 17a and 17b which can be obtained by sintering powder can be obtained by forming a predetermined powder layer by a previous molding process which is performed before the sintering process. Then, the power layer is sintered so that the foregoing shape is obtained. Therefore, a shape similar to that of the powder layer can be obtained. Thus, counter electrodes 17a and 17b substantially free from edges can be formed, for example, as shown in FIGS. 2A and 2B. Therefore, the concentration of electric fields as described with reference to FIG. 17 can be relaxed. As a result, formation of relatively large particles of silver deposited from the silver-salt solution 1 can be prevented. Thus, also the second embodiment is able to prevent formation of inactive silver particles on the counter electrodes 17a and 17b which float in the silver-salt solution 1 and which deteriorate the transparency of the device when decoloring of the working electrode is performed and which cause the electrodes to be short-circuited.

Third Embodiment

Figure 3:
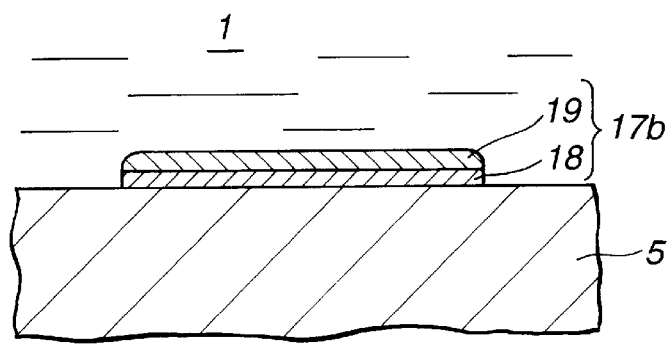
FIG. 3 is an enlarged cross sectional view showing the counter electrode of an optical filter according to a third embodiment of the present invention.

Referring to FIG. 3, a third embodiment of the present invention will now be described. In the third embodiment, elements corresponding to those according to the first and second embodiments are given the same reference numerals as those according to the first and second embodiments.

As shown in the drawings, the third embodiment has a structure that a lower conductive layer 18 in the form of metal foil made of silver, copper, stainless steel or ITO is provided for each of substrates 4 and 5 (the substrate 5 is illustrated) with a bonding agent or the like. A paste layer 19 is formed on the lower conductive layer 18. The lower conductive layer 18 and the paste layer 19 form counter electrodes 17a and 17b (the counter electrode 17b is illustrated) substantially similar to those shown in FIG. 1.

In the third embodiment, the paste layer 19 has the composition similar to that of the counter electrodes 17a and 17b according to the first embodiment. That is, the paste layer 19 is formed by conductive paste prepared by mixing conductive particles composed of a metal material, such as silver, and carbon material, and a binder. The type, the mixture ratio and the like of the conductive particles and the binder may substantially the same as those according to the first embodiment.

The other structures of the third embodiment are the same as those of the first embodiment. Therefore, the same structures are omitted from description.

Since the third embodiment has the structure that the surface layers of the counter electrodes 17a and 17b are made of the mixture of the conductive particles and the binder, the cost of the material of the counter electrodes 17a and 17b can be reduced as compared with the structure in which the overall bodies of the counter electrodes are made of metal plates or the like.

The paste layer 19 which is the surface layer of each of the counter electrodes 17a and 17b has substantially no edges as described in the first embodiment with reference to FIG. 2. Therefore, also the third embodiment is able to form the counter electrodes 17a and 17b which is substantially free from edges. Thus, the concentration of electric fields as described with reference to FIG. 17 can be relaxed. As a result, formation of relatively large particles of silver deposited from the silver-salt solution 1 can be prevented. Thus, also the third embodiment is able to prevent formation of inactive silver particles on the counter electrodes 17a and 17b which float in the silver-salt solution 1 and which deteriorate the transparency of the device when decoloring of the working electrode is performed and which cause the electrodes to be short-circuited.

The third embodiment has the structure that the lower conductive layer 18 having relatively great mechanical strength and low resistance is formed below the paste layer 19. Therefore, the overall mechanical strength of each of the counter electrodes 17a and 17b can be raised and the electric resistance of the same can be lowered. Since the electric resistance of each of the counter electrodes 17a and 17b can be lowered as described above, the optical apparatus can be operated with a low voltage.

The third embodiment may be structured such that the lower conductive layer 18 is made of ITO which is the same material as that for making the working electrode. In the foregoing case, the lower conductive layer 18 can conveniently be formed in the same process for forming the working electrodes 2a to 2e and 3a to 3e (see FIG. 1).

The structure of the third embodiment may be combined with the structure of the second embodiment. That is, surface layers of the counter electrodes 17a and 17b may be formed by sintered layers formed by sintering the conductive particles in place of the paste layer 19. Also in the foregoing case, an effect substantially similar to that obtainable from the foregoing structures can be obtained.

Fourth Embodiment

Figure 4:
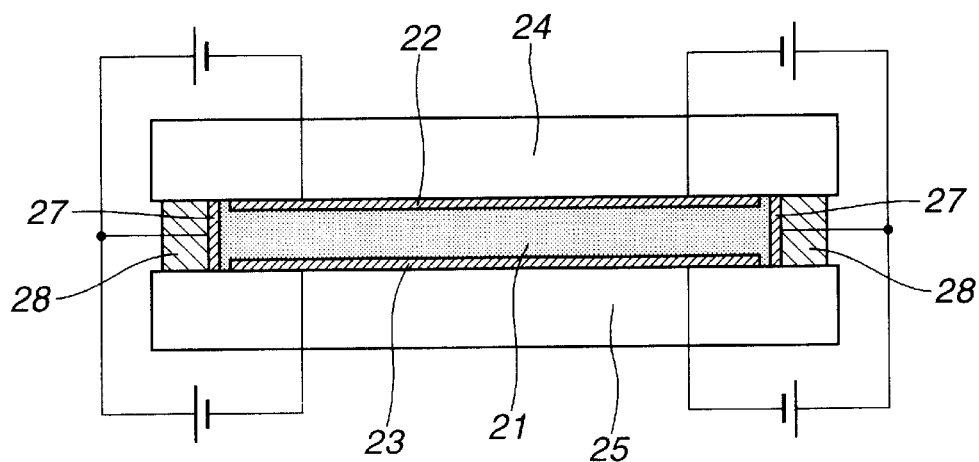
FIG. 4 is a cross sectional view showing the structure of an optical filter according to fourth and fifth embodiments of the present invention.
Figure 13A:
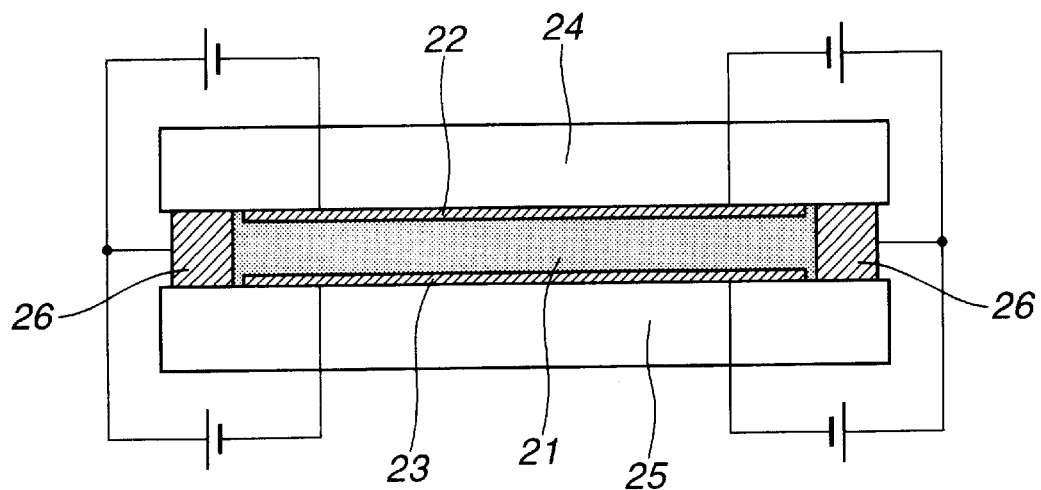
FIGS. 13A and 13B are cross sectional views showing the structure of a conventional electrochemical dimming device and the principle of its operation.
Figure 13B:
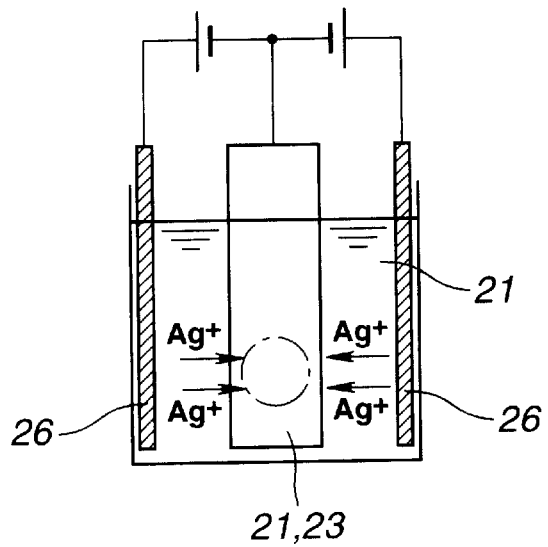
Figure 14:
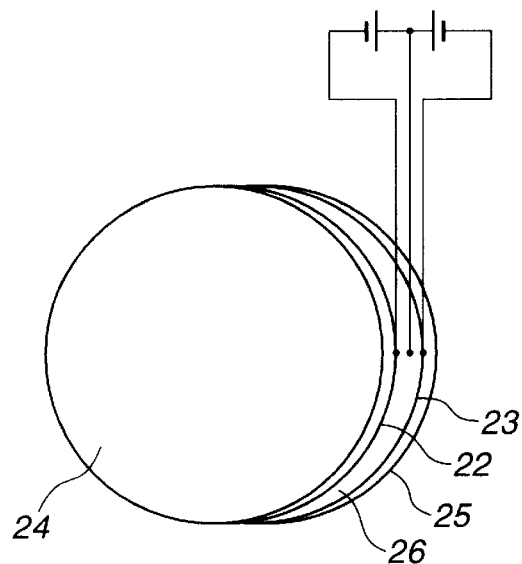
FIG. 14 is a perspective view showing the device show in FIG. 13.

Referring to FIG. 4, a fourth embodiment of the present invention will now be described. As shown in FIG. 4, the structure of the fourth embodiment is formed by applying the present invention to the electrochemical dimming device described with reference to FIGS. 13 and 14.

That is, a pair of transparent substrates (for example, glass substrates) 24 and 25 serving as display windows are disposed apart from each other for a predetermined distance. Working electrodes (for example, ITO electrodes) 22 and 23 are formed on the inner surfaces (opposite surfaces) of the substrates 24 and 25. Silver-salt solution 21 is placed between the opposite working electrodes 22 and 23.

A spacer 28 in the form of, for example, a glass plate or the like is disposed between the outer peripheries of the outer peripheries of the substrates 24 and 25. A counter electrode 27 formed by conductive paste similar to that according to the first embodiment or a sintered layer similar to the second embodiment is formed on the inner surface of the spacer 28 (see FIG. 4).

Since the fourth embodiment has the structure that the counter electrode 27 is formed on only the surface of the spacer 28, the cost of the material of the spacer can considerably be reduced as compared with the conventional structure arranged such that the overall body of the spacer serving as the counter electrode is formed by a silver plate or the like.

FIGS. 5 to 10 show results of experiments of the relationship between the wavelength of light and transmittance of the ITO working electrode when the conductive paste and the sintered carbon layer are used as the counter electrodes according to the fourth embodiment. In the graphs, the axis of ordinate stands for the transmittance [%] and axis of abscissa stands for the wavelength [nm] of light.

As the silver salt, silver bromide was employed, and DMSO was employed as the solvent. The concentration of AgBr was made to be 500 mM/l. As the supporting salt, 500 mM/l tetra-n-butyl ammonia iodide was dissolved so that electrolyte was prepared. As the working electrode, an ITO transparent electrode having a diameter of 7 mmf was employed.

Figure 5:
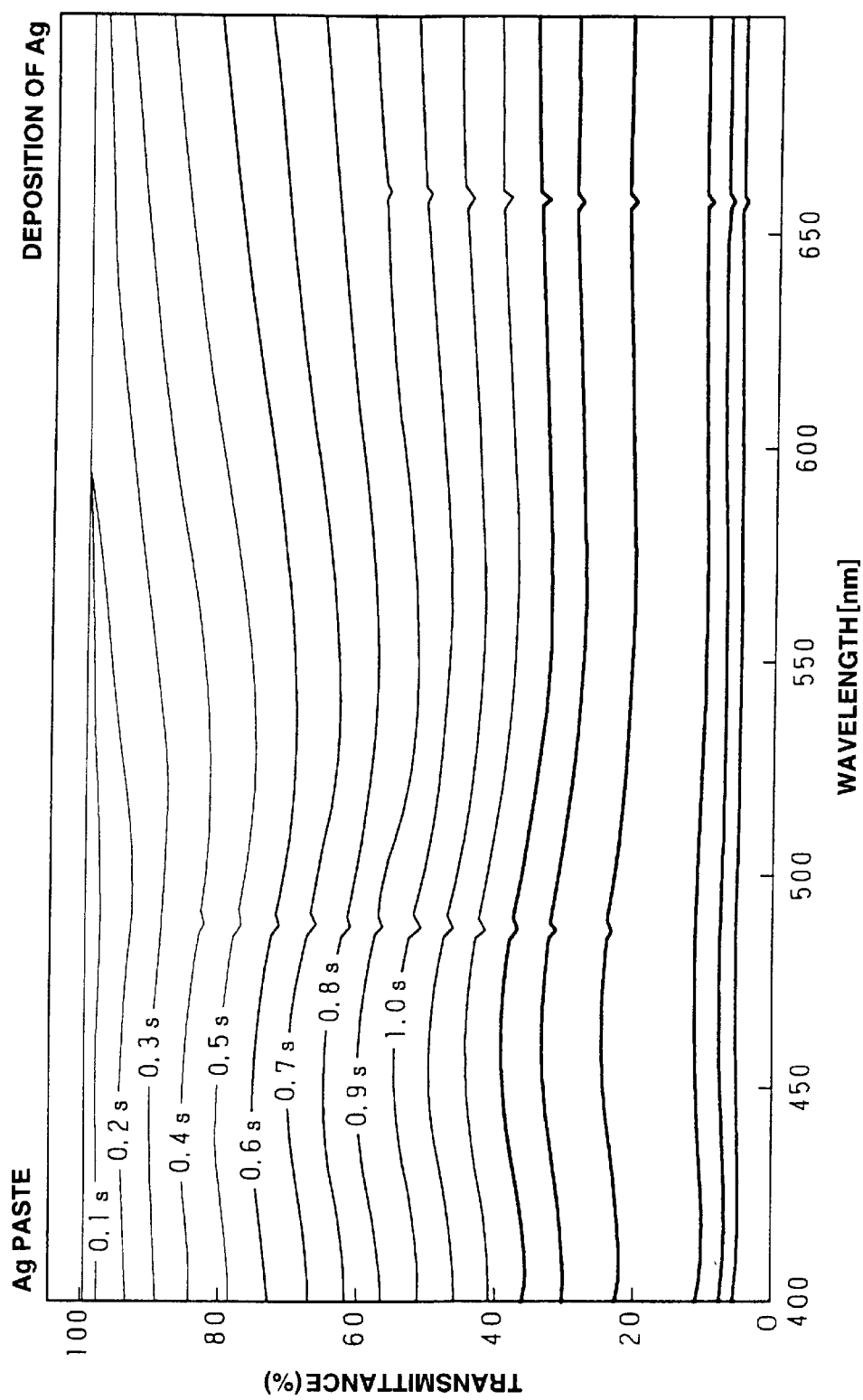
FIG. 5 is a graph showing the relationship between the wavelength of light and transmittance when silver is deposited in a case where silver paste is employed to form the counter electrode.
Figure 6:
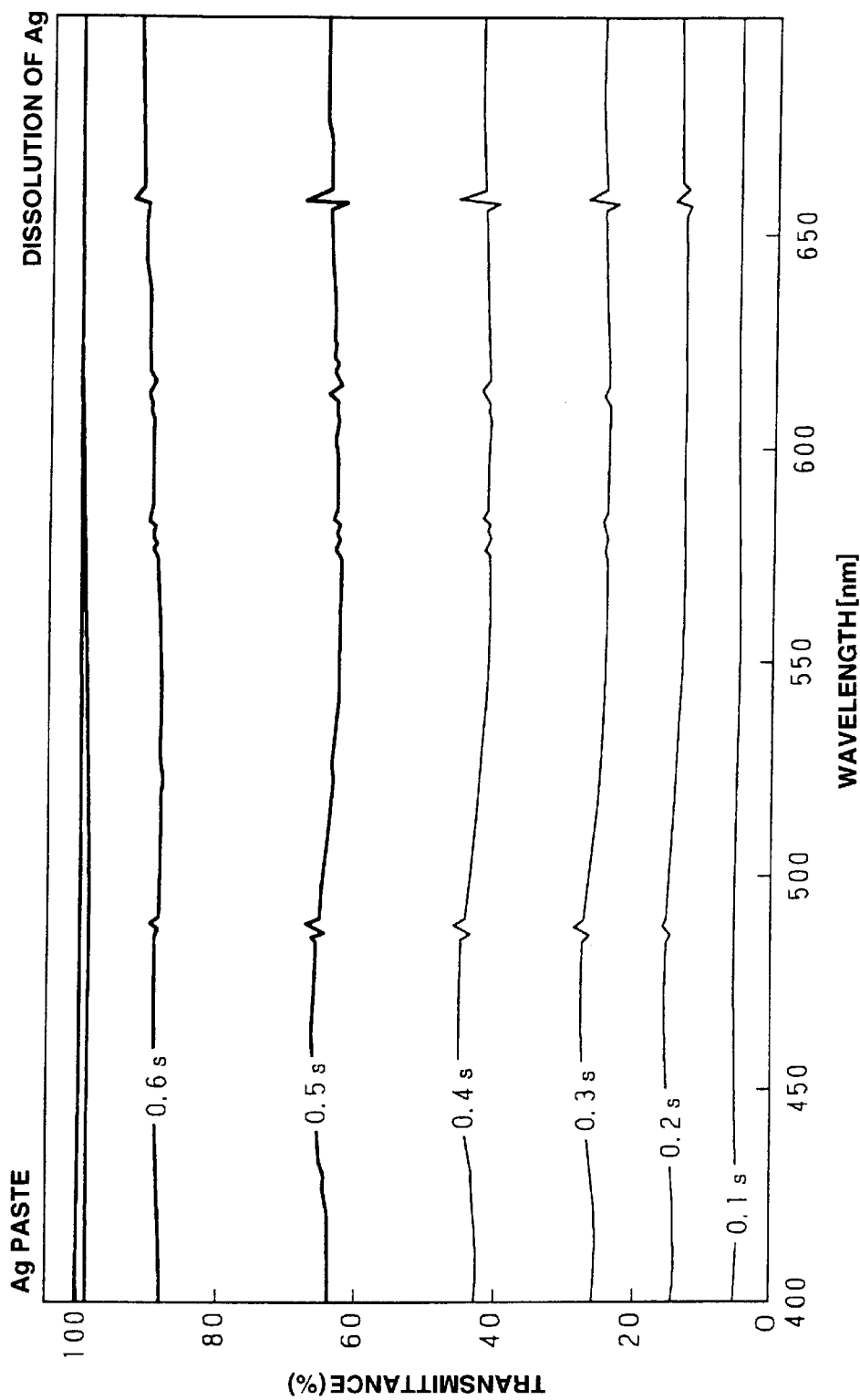
FIG. 6 is a graph showing the relationship between the wavelength of light and transmittance when silver is dissolved in a case where silver paste is employed to form the counter electrode.

FIGS. 5 and 6 show change in the transmittance when silver was deposited on the working electrode and that when silver was dissolved from the working electrode in a case where conductive paste prepared such that the mixture ratio (the weight ratio) of the binder (an epoxy type binder) and silver particles was about 90:10 was employed as the counter electrode. The operation was performed by a constant potential method. When silver was deposited as shown in FIG. 5, the operation was performed at an applied voltage level of −0.8 V for two seconds. When silver was dissolved as shown in FIG. 6, the operation was performed at an applied voltage level of +1.0 V for two seconds.

As can be understood from FIGS. 5 and 6, when the working electrode develops color (when silver is deposited as shown in FIG. 5), change in the transmittance occurring because of the wavelength is restrained. Therefore, irregularity (irregular color) in the transmittance occurring because of the wavelength can be restrained. Another fact can be understood that the transmittance can relatively quickly be restored (decoloring is performed) when decoloring of the working electrode is performed (when silver is dissolved as shown in FIG. 6).

Figure 7:
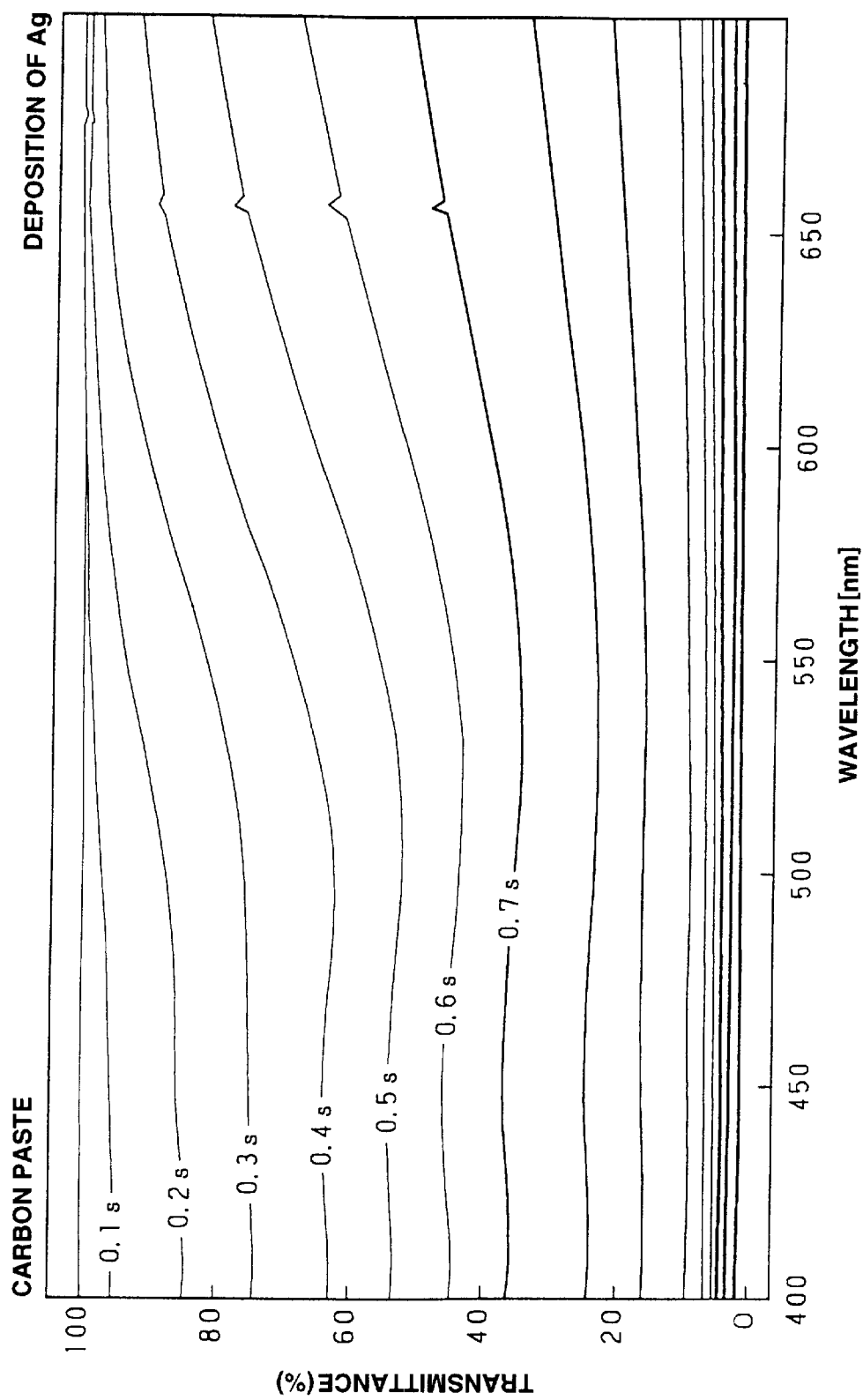
FIG. 7 is a graph showing the relationship between the wavelength of light and transmittance when silver is deposited in a case where carbon paste is employed to form the counter electrode.
Figure 8:
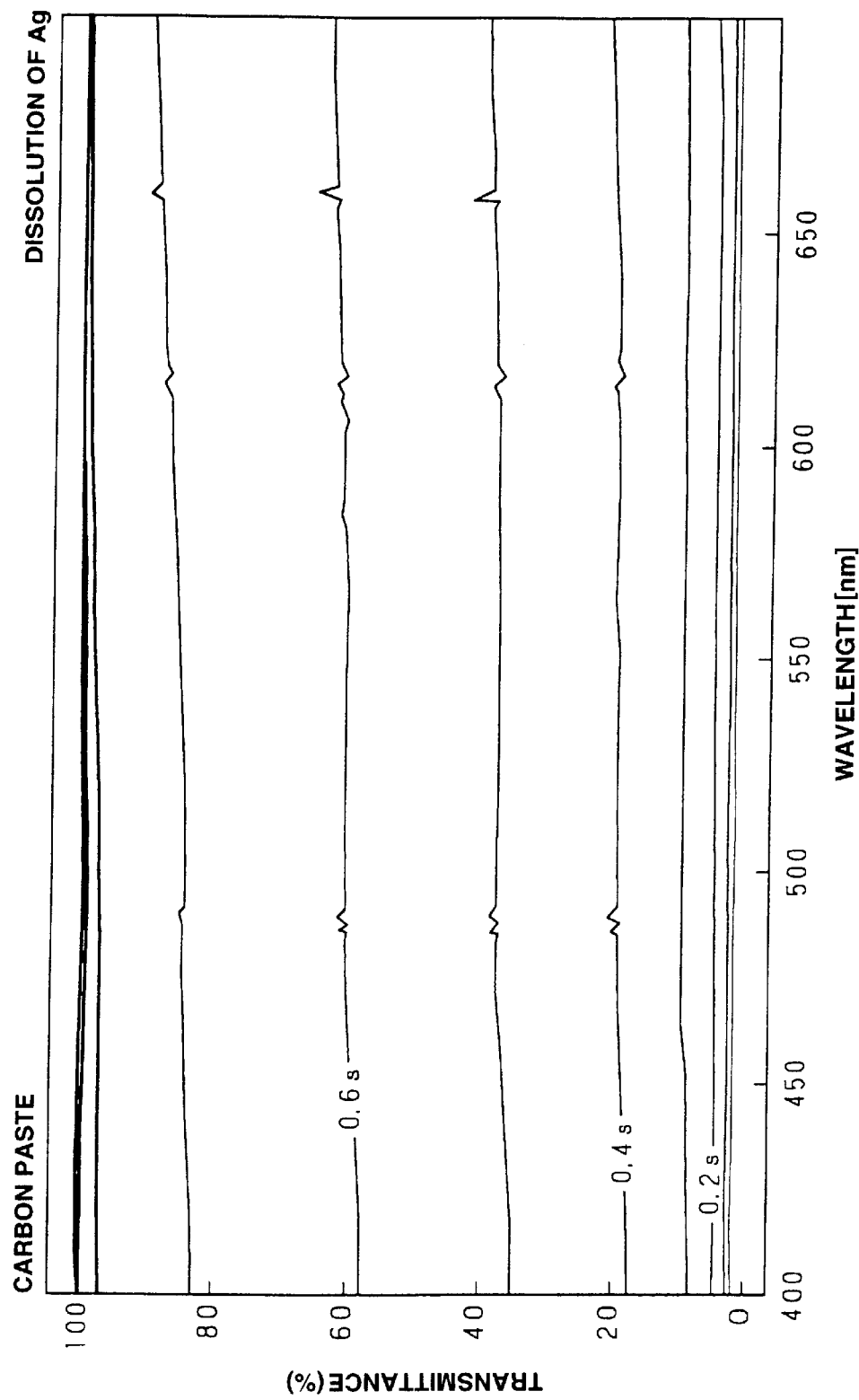
FIG. 8 is a graph showing the relationship between the wavelength of light and transmittance when silver is dissolved in a case where carbon paste is employed to form the counter electrode.

FIGS. 7 and 8 show change in the transmittance when silver was deposited on the working electrode and that when silver was dissolved from the working electrode in a case where conductive paste prepared such that the mixture ratio (the weight ratio) of the binder (an epoxy type binder) and carbon black particles was about 80:20 was employed as the counter electrode. The operation was performed by a constant potential method. When silver was deposited as shown in FIG. 7, the operation was performed at an applied voltage level of −0.8 V for two seconds. When silver was dissolved as shown in FIG. 8, the operation was performed at an applied voltage level of +1.0 V for two seconds.

As can be understood from FIGS. 7 and 8, the decoloring (dissolution of silver as shown in FIG. 8) speed is somewhat reduced as compared with the structure in which the silver paste is employed as shown in FIGS. 5 and 6. However, coloring (silver deposition shown in FIG. 7) speed of the working electrode can be raised (therefore, the operation speed of the device is raised). Although change in the transmittance because of the wavelength somewhat deteriorates as compared with the structure in which silver paste is employed as shown in FIGS. 5 and 6, no practical problem is raised.

Figure 9:
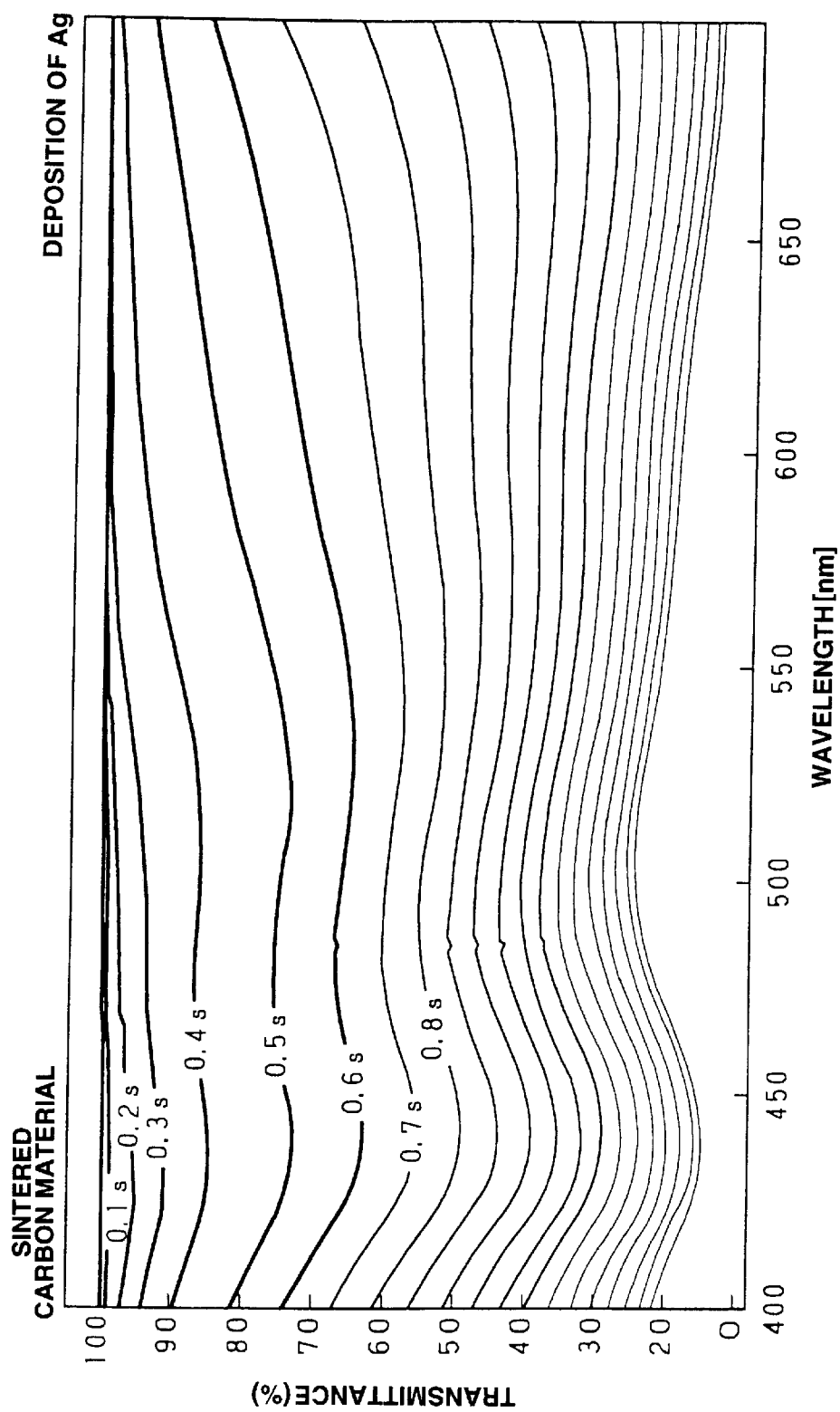
FIG. 9 is a graph showing the relationship between the wavelength of light and transmittance when silver is deposited in a case where sintered carbon layer is employed to form the counter electrode.
Figure 10:
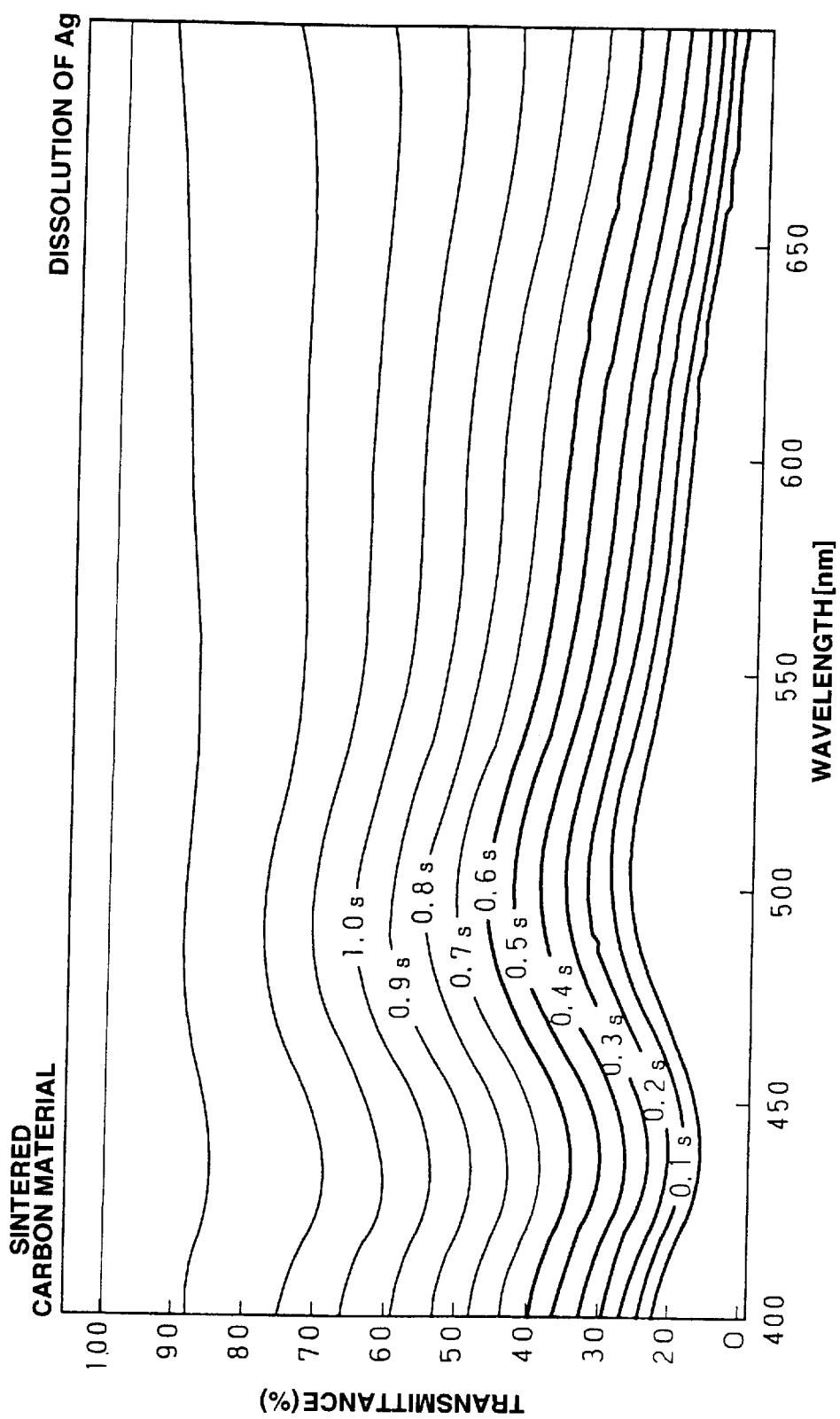
FIG. 10 is a graph showing the relationship between the wavelength of light and transmittance when silver is dissolved in a case where sintered carbon layer is employed to form the counter electrode.

FIGS. 9 and 10 show change in the transmittance when silver was deposited on the working electrode and that when silver was dissolved from the working electrode in a case where the sintered carbon layer was employed as the counter electrode. The operation was performed by a constant potential method. When silver was deposited as shown in FIG. 9, the operation was performed at an applied voltage level of −1.2 V for two seconds. When silver was dissolved as shown in FIG. 10, the operation was performed at an applied voltage level of +0.5 V for two seconds.

As can be understood from FIGS. 9 and 10, when the sintered carbon layer is employed, change in the transmittance because of the wavelength deteriorates as compared with the case where the conductive paste is employed as shown in FIGS. 5 to 8. However, the deterioration does not raise any practical problem.

The following table shows a state of generation of deposits on the counter electrode when the silver plate (conventional example), the silver paste, the carbon paste and the sintered carbon layer were employed as the counter electrode in the experiments described with reference to FIGS. 5 to 10 after the optical apparatus was operated 20,000 times.

| Type of Counter Electrode | Deposits on Counter Electrode |
| --- | --- |
| Silver Plate | Generated |
| Silver Paste | Slightly |
| Carbon Paste | Not Generated |
| Sintered Carbon Layer | Not Generated |

As can be understood from the above-mentioned results, when the conventional silver plate is employed, silver particles (see FIG. 15) formed at the edges are not dissolved when decoloring of the working electrode is performed. The silver particles are left on the counter electrode. On the other hand, when the silver paste is employed, formation of the inactive silver particles can be prevented. Therefore, generation of deposits on the counter electrode can substantially be prevented. When the carbon paste or the sintered carbon layer is employed, formation of inactive silver particles can substantially be prevented. Therefore, generation of deposits on the counter electrode can substantially be prevented.

That is, the present invention using the conductive paste or the sintered layer is able to prevent formation of inactive silver particles on the counter electrode. Thus, contamination of the silver-salt solution because of the inactive silver particles can be prevented.

Fifth Embodiment

Figure 11A:
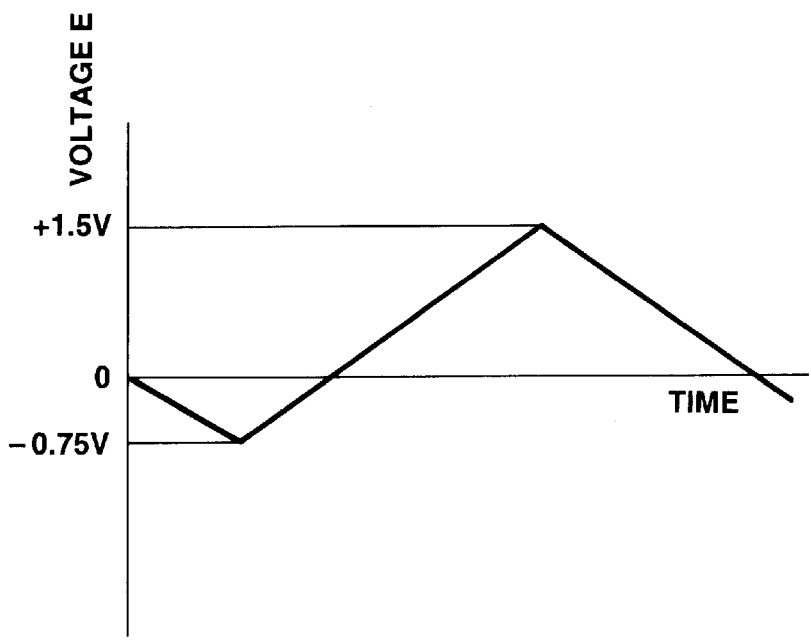
FIGS. 11A and 11B are graphs showing waveforms of sweeping voltages and polarized voltages realized during operation.
Figure 11B:
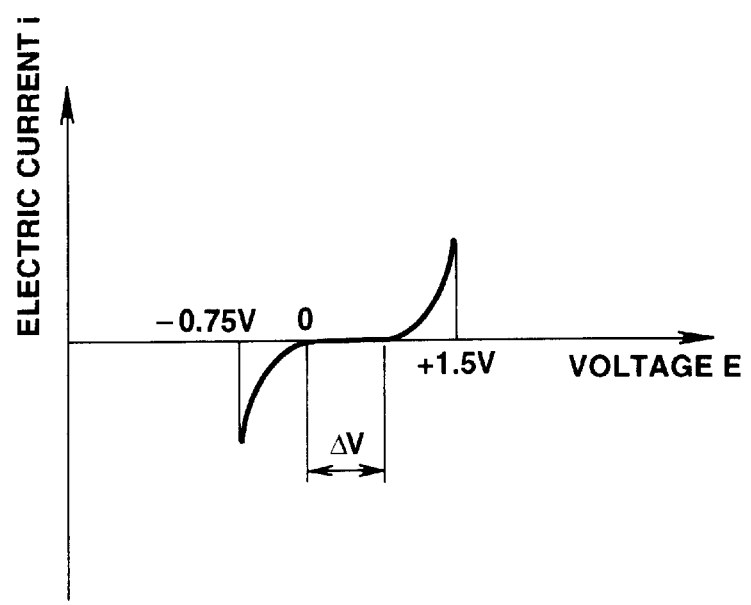
Figure 12:
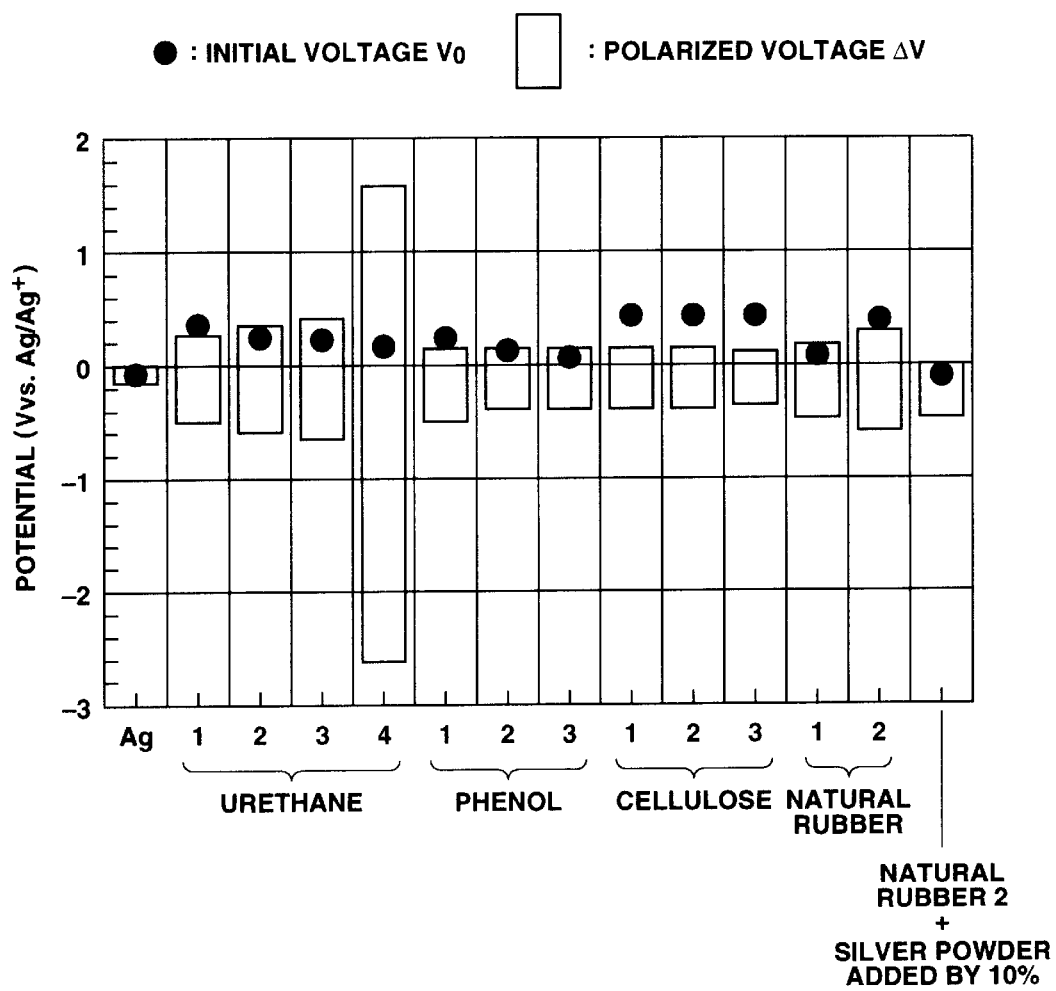
FIG. 12 is a graph showing initial voltage $V_0$ and voltage DV of the electrode realized for each of the various counter electrodes during the operation.

Referring to FIGS. 11A, 11B and 12, a fifth embodiment of the present invention will now be described.

The fifth embodiment has a structure that the present invention is applied to an electrochemical dimming device similar to that according to the fourth embodiment. Since the structures except for the material of the counter electrode 27 are the same, common elements are omitted from description.

In the fifth embodiment, the counter electrodes are formed by applying or printing paste prepared by mixing carbon serving as the conductive particles with a variety of binders at a variety of mixing ratios and by applying or printing a material obtained by adding silver particles to the foregoing mixture (paste) in a predetermined quantity. The binder and the conductive particles (the carbon and the silver particles) are selected from those according to the first embodiment.

As described above, the counter electrodes formed by changing the type of the binder and the mixing ratio of carbon and by adding the silver particles were used to measure the potential (initial potential $V_0$: Vvs.Ag/Ag$^+$) between electrodes immediately after the electrodes were immersed in electrolyte. Moreover, an ITO electrode was employed and operation was performed as shown in FIG. 11A such that the sweeping speed was 100 mV/S from a voltage level of –0.75 V on the reduction side to that of +1.5 V on the oxidizing side. The degree of polarization (polarized voltage) of each electrode indicated with DV shown in FIG. 11B was measured and evaluated. Results are shown in the following Table 1 and FIG. 12.

TABLE 1

| Material of Counter Electrode | Initial Voltage $V_0$ (mV vs. Ag/Ag$^+$) | Polarized Voltage DV (mV) |
| --- | --- | --- |
| Ag plate | –70 mV | 110 mV |
| Urethane 1 | +340 mV | 740 mV |
| Urethane 2 | +320 mV | 980 mV |
| Urethane 3 | +340 mV | 1100 mV |

TABLE 1-continued

| Material of Counter Electrode | Initial Voltage $V_0$ (mV vs. Ag/Ag$^+$) | Polarized Voltage DV (mV) |
| --- | --- | --- |
| Urethane 4 | +200 mV | 3900 mV |
| Phenol 1 | +200 mV | 580 mV |
| Phenol 2 | +120 mV | 440 mV |
| Phenol 3 | +50 mV | 510 mV |
| Cellulose 1 | +300 mV | 500 mV |
| Cellulose 2 | +340 mV | 480 mV |
| Cellulose 3 | +330 mV | 460 mV |
| Natural Rubber 1 | +150 mV | 660 mV |
| Natural Rubber 2 | +410 mV | 800 mV |
| Natural Rubber 2 + Silver Powder Added By 10% | –100 mV | 440 mV |

Figures provided for each binder shown in Table 1 and FIG. 12 are mixture ratios of carbon with respect to the various binders (for example, Urethane 1 indicates a weight ratio between urethane resin:carbon which is 99:1).

A fact can be understood that when the conductive particles are made of only the carbon material, the initial voltage $V_0$ is moved in a positive direction by 50 mV or greater as compared with silver. Even if the composition ratio is varied, it is difficult to design the initial value $V_0$ to be a similar level to the potential of silver. Moreover, also the polarized voltage DV is raised.

If silver powder is added to natural rubber 2 by 0.1 time (10%) in terms of a weight ratio, design can be performed such that the initial potential $V_0$ can be lowered by 30 mV with respect to silver. Moreover, the polarized voltage can considerably be lowered. However, samples prepared by adding carbon to the binder and by adding the silver powder by 10% and having the structure that the ITO forming the ground have the potential of +250 mV vs.Ag/Ag$^+$. Therefore, the potential becomes a value obtained by adding the foregoing potential. The initial potential of the sample according to the present invention and prepared by adding Ag powder to natural rubber 2 by 10%, however, is made to be lowered by only 30 mV as compared with that in the case of the Ag plate.

The foregoing natural rubber has an average molecular weight of 50,000 to 60,000, specifically, 55,000. As an alternative to this, another binder containing carboxymethyl cellulose (having an average molecular weight of 20,000 to 30,000, specifically, 22,000) may be employed to obtain a similar effect.

When the optical apparatus is operated by using the counter electrode to which no silver is added, silver is deposited on the counter electrode. Therefore, the composition of the counter electrode is changed as time elapses and thus the potential can easily be shifted. When silver is previously added as described above, the device can stably be operated.

Also the device comprising the counter electrode formed by natural rubber 2+silver powder by 10% added is free from a large amount of deposits on the counter electrode. Thus, data of transmittance similar to that shown in FIGS. 5 and 6 can be obtained.

Although the invention has been described in its preferred form with a certain degree of particularity, it is understood that the present disclosure of the preferred form can be changed in the details of construction and in the combination and arrangement of parts without departing from the spirit and the scope of the invention.

For example, it is preferable that the counter electrode is fully formed by the application or the like according to the present invention. At least the surface of the counter electrode adjacent to the silver-salt solution may be formed by the application or the like according to the present invention (in the foregoing case, the ground may be made of usual metal as employed in the third embodiment). The pattern of the electrode shown in FIG. 1 is not limited to the concentric shape. The pattern may be changed to any one of a stripe pattern, a lattice pattern and so forth. A cell may be provided for each of the divided electrodes.

The optical apparatus according to the present invention may be combined with another known filter member (for example, an organic electrochromic member, liquid crystal, an electroluminescent material).

The optical apparatus according to the present invention can variously be applied as an apparatus for adjusting the liquid quantity of any one of various optical systems, for example, electrophotographic copying machine, an optical communication apparatuses and so forth as well as the optical diaphragm of the CCD. Moreover, the optical apparatus according to the present invention may be applied to any one of various image display units for displaying characters and images as well as the optical filter.

The present invention has a structure such that at least the surface of either of the electrodes of an optical device, such as an electrochemical dimming device, using deposition/dissolution of silver is formed by the mixture of the conductive particles and the binder or the material obtained by sintering the conductive particles. Therefore, the cost of the material of the electrodes can be reduced as compared with the structure in which the overall body of the electrodes are made of metal plates or the like.

Since either of the electrodes can be made to be substantially free from edges, local concentration of electric fields on the electrode can be relaxed. As a result, deposition of inactive and granular silver on the electrode can be reduced or prevented. As a result, floating of the inactive silver particles in the silver-salt solution which causes the transparency of the device to deteriorate and shortcut to take between the electrodes can be prevented.

Although modifications and changes may be suggested by those skilled in the art, it is the intention of the inventors to embody within the patent warranted hereon all changes and modifications as reasonably and properly come within the scope of their contribution to the art.

What is claimed is:

1. An optical apparatus comprising:
    a pair of electrodes;
    silver-salt solution placed in contact with said pair of electrodes,
    wherein,
        at least the surface of either of said electrodes has conductive particles comprising silver and at least one type of a binder.

2. An optical apparatus according to claim 1, wherein optical characteristics of the apparatus are changed because of dissolution/deposition of silver in said silver-salt solution.

3. An optical apparatus according to claim 2, wherein a DC operating voltage is applied between said pair of electrodes so that silver is deposited in said silver-salt solution and the optical characteristics are changed.

4. An optical apparatus comprising:
    a pair of electrodes;
    silver-salt solution placed in contact with said pair of electrodes,
    wherein at least the surface of either of said electrodes contains at least one type of conductive particles and at least one type of a binder, and
    wherein said binder is made of at least one type of a resin material selected from a group consisting of a natural rubber material, a cellulose material, a phenol material, an urethane material and an epoxy type material.

5. An optical apparatus according to claim 1, wherein the other conductive particles comprise carbon.

6. An optical apparatus comprising:
    a pair of electrodes;
    silver-salt solution placed in contact with said pair of electrodes,
    wherein at least the surface of either of said electrodes is formed by silver particles, conductive particles except for silver and at least one type of a binder, and
    wherein said silver particles are added at a weight ratio of 0.01 time to 100 times a component composed of the conductive particles except for silver and said binder.

7. An optical apparatus according to claim 6, wherein said silver particles are added at a weight ratio of 0.01 time to 100 times a solid component of paste composed of the conductive particles except for silver and said binder.

8. An optical apparatus comprising:
    a pair of electrodes;
    silver-salt solution placed in contact with said pair of electrodes,
    wherein at least the surface of either of said electrodes is formed by silver particles, conductive particles except for silver and at least one type of a binder, and
    wherein said silver particles are added to at least the surface of either of said electrodes in such a manner that the difference between the potential of either of said electrodes and the potential of a silver electrode is 50 mV or lower.

9. An optical apparatus comprising:
    a pair of electrodes;
    silver-salt solution placed in contact with said pair of electrodes,
    wherein at least the surface of either of said electrodes contains at least one type of conductive particles and at least one type of a binder, and
    wherein at least the surface of either of said electrodes is formed by previous silver plating or by silver-evaporated conductive particles except for silver and said binder.

10. An optical apparatus according to claim 9, wherein silver used in silver plating or silver evaporation is added at a weight ratio of 0.01 time to 100 times a component composed of said conductive particles except for silver and said binder.

11. An optical apparatus according to claim 10, wherein silver used in silver plating or silver evaporation is added at a weight ratio of 0.01 time to 100 times a solid component of paste composed of said conductive particles except for silver and said binder.

12. An optical apparatus according to claim 9, wherein at least the surface of either of said electrodes is formed by paste prepared by pulverizing said conductive particles except for silver used in previous silver plating or silver evaporation and by mixing said conductive particles with said binder.

13. An optical apparatus according to claim 9, wherein when the potential of either of said electrodes is different from the potential of said silver electrode by a positive level or a negative level of 50 mV or greater, said conductive particles are added to said binder.

14. An optical apparatus according to claim 1, wherein either of said electrodes incorporates a first conductive layer containing said conductive particles and said binder and a second conductive layer formed below said first conductive layer.

15. An optical apparatus according to claim 14, wherein said second conductive layer is formed by metal foil or a thin conductive film.

16. An optical apparatus comprising:
   a pair of electrodes;
   silver-salt solution placed in contact with said pair of electrodes,
   wherein at least the surface of either of said electrodes contains at least one type of conductive particles and at least one type of a binder,
   wherein either of said electrodes incorporates a first conductive layer containing said conductive particles and said binder and a second conductive layer formed below said first conductive layer, and
   wherein said second conductive layer is made of the same material as that of the other electrode of said pair of said electrodes.

17. An optical apparatus comprising:
   a pair of electrodes;
   silver-salt solution placed in contact with said pair of electrodes,
   wherein at least the surface of either of said electrodes contains at least one type of conductive particles and at least one type of a binder, and
   wherein substantially no edge exists at ends of either of said electrodes.

18. An optical apparatus according to claim 1, further comprising a pair of transparent or semi-transparent substrates disposed opposite to each other, at least one pair of transparent or semi-transparent electrodes each of which is provided for each of opposite surfaces of said pair of transparent or semi-transparent substrates such that said pair of transparent or semi-transparent electrodes are disposed opposite to each other, said silver-salt solution placed in contact with said at least one pair of transparent or semi-transparent electrodes such that said silver-salt solution is placed between said at least one pair of transparent or semi-transparent electrodes and a counter electrode disposed in contact with said silver-salt solution and containing said conductive particles and said binder.

19. An optical apparatus according to claim 18, wherein said transparent or semi-transparent electrode is made of indium-tin oxide.

20. An optical apparatus according to claim 18, wherein said counter electrode containing said conductive particles and said binder is formed in the outer peripheries of said pair of transparent or semi-transparent electrodes.

21. An optical apparatus according to claim 20, wherein said pair of transparent or semi-transparent electrodes are disposed apart from each other for a predetermined distance by a spacer formed along the outer peripheries and said counter electrode containing said conductive particles and said binder is formed on the inner surface of said spacer.

22. An optical apparatus according to claim 20 wherein said pair of transparent or semi-transparent electrodes are disposed apart from each other for a predetermined distance by a spacer formed along the outer peripheries and said spacer is made to be a counter electrode containing said conductive particles and said binder.

23. A method of manufacturing an optical apparatus in which a silver-salt solution is placed in contact with a pair of electrodes, said method comprising the step of:
   applying a mixture containing conductive silver particles and at least one binder to the surface of at least one of said electrodes to form a surface containing conductive particles,
   wherein said conductive particles comprise silver particles and other conductive particles.

24. A method of manufacturing an optical apparatus according to claim 23, in which a silver-salt solution is placed in contact with a pair of electrodes, said method comprising the step of:
   printing or applying a mixture containing at least one type of conductive particles and at least one type of a binder so that at least a surface of either of said pair of said electrodes is formed,
   wherein said binder is made of at least one type of a resin material selected from a group consisting of a natural rubber material, a cellulose material, a phenol material, an urethane material and an epoxy type material.

25. A method of manufacturing an optical apparatus according to claim 23, wherein the other conductive particles comprise carbon.

26. A method of manufacturing an optical apparatus in which a silver-salt solution is placed in contact with a pair of electrodes, said method comprising the step of:
   printing or applying a mixture containing at least one type of conductive particles, and at least one type of a binder so that at least a surface of either of said pair of said electrodes is formed,
   wherein at least the surface of either of said electrodes is formed by printing or applying a mixture composed of silver particles, conductive particles except for silver and said binder, and
   wherein said silver particles are added at a weight ratio of 0.01 time to 100 times a component composed of said conductive particles, except for silver and said binder.

27. A method of manufacturing an optical apparatus in which a silver-salt solution is placed in contact with a pair of electrodes, said method comprising the step of:
   printing or applying a mixture containing at least one type of conductive particles, and at least one type of a binder so that at least a surface of either of said pair of said electrodes is formed,
   wherein at least the surface of either of said electrodes is formed by printing or applying a mixture composed of silver particles, conductive particles except for silver and said binder, and
   wherein said silver particles are added at a weight ratio of 0.01 time to 100 times a solid component of paste composed of said conductive particles, except for silver and said binder.

28. A method of manufacturing an optical apparatus in which a silver-salt solution is placed in contact with a pair of electrodes, said method comprising the step of:
   printing or applying a mixture containing at least one type of conductive particles and at least one type of a binder so that at least a surface of either of said pair of said electrodes is formed,
   wherein at least the surface of either of said electrodes is formed by printing or applying a mixture composed of silver particles, conductive particles except for silver and said binder, and
   wherein when the potential of either of said electrodes is different from the potential of said silver electrode by a positive level or a negative level of 50 mV or greater, said silver particles are added to paste composed of said conductive particles and said binder.

29. A method of manufacturing an optical apparatus in which a silver-salt solution is placed in contact with a pair of electrodes, said method comprising the step of:
    printing or applying a mixture containing at least one type of conductive particles and at least one type of a binder so that at least a surface of either of said pair of said electrodes is formed,
    wherein at least the surface of either of said electrodes is formed by printing or applying said mixture composed of said conductive particles except for silver previously used in silver plating or silver evaporation and said binder.

30. A method of manufacturing an optical apparatus according to claim 29, wherein silver used in silver plating or silver evaporation is added at a weight ratio of 0.01 time to 100 times a component composed of said conductive particles except for silver and said binder.

31. A method of manufacturing an optical apparatus according to claim 30, wherein silver used in silver plating or silver evaporation is added at a weight ratio of 0.01 time to 100 times a solid component of paste composed of said conductive particles except for silver and said binder.

32. A method of manufacturing an optical apparatus according to claim 29, wherein at least the surface of either of said electrodes is formed by printing or applying paste prepared by pulverizing said conductive particles except for silver previously used in previous silver plating or silver evaporation and by mixing said conductive particles with said binder.

33. A method of manufacturing an optical apparatus according to claim 29, wherein when the potential of either of said electrodes is different from the potential of said silver electrode by a positive level or a negative level of 50 mV or greater, said conductive particles are added to said binder.

34. A method of manufacturing an optical apparatus according to claim 23, wherein either of said electrodes incorporates a first conductive layer containing said conductive particles and said binder and a second conductive layer formed below said first conductive layer.

35. A method of manufacturing an optical apparatus according to claim 34, wherein said second conductive layer is formed by metal foil or a thin conductive film.

36. A method of manufacturing an optical apparatus in which a silver-salt solution is placed in contact with a pair of electrodes, said method comprising the step of:
    printing or applying a mixture containing at least one type of conductive particles and at least one type of a binder so that at least a surface of either of said pair of said electrodes is formed,
    wherein said second conductive layer is formed by metal foil or a thin conductive film, and
    wherein said second conductive layer is made of the same material as that of the other electrode of said pair of said electrodes.

37. A method of manufacturing an optical apparatus in which a silver-salt solution is placed in contact with a pair of electrodes, said method comprising the step of:
    printing or applying a mixture containing at least one type of conductive particles and at least one type of a binder so that at least a surface of either of said pair of said electrodes is formed,
    wherein substantially no edge exists at ends of either of said electrodes.

38. A method of manufacturing an optical apparatus according to claim 23, wherein an optical apparatus is manufactured which incorporates a pair of transparent or semi-transparent substrates disposed opposite to each other, at least one pair of transparent or semi-transparent electrodes each of which is provided for each of opposite surfaces of said pair of transparent or semi-transparent substrates such that said pair of transparent or semi-transparent electrodes are disposed opposite to each other, said silver-salt solution placed in contact with said at least one pair of transparent or semi-transparent electrodes such that said silver-salt solution is placed between said at least one pair of transparent or semi-transparent electrodes and a counter electrode disposed in contact with said silver-salt solution and containing said conductive particles and said binder.

39. A method of manufacturing an optical apparatus according to claim 38, wherein said transparent or semi-transparent electrode is made of indium-tin oxide.

40. An optical apparatus comprising:
    a pair of electrodes; and
    silver-salt solution placed in contact with said pair of said electrodes,
    wherein at least the surface of either of said pair of electrodes is formed by sintering conductive particles containing silver particles and other conductive particles.

41. An optical apparatus according to claim 40, wherein the optical characteristics are changed because of dissolution/deposition of silver in said silver-salt solution.

42. An optical apparatus according to claim 41, wherein a DC operating voltage is applied between said pair of electrodes so that silver is deposited in said silver-salt solution and the optical characteristics are changed.

43. An optical apparatus comprising:
    a pair of electrodes; and
    silver-salt solution placed in contact with said pair of said electrodes between said pair of electrodes,
    wherein at least the surface of either of said pair of electrodes is formed by sintering at least one type of conductive particles,
    wherein at least the surface of either of said electrodes is formed by a sintered layer composed of silver particles and conductive particles except for silver.

44. An optical apparatus according to claim 43, wherein when the potential of either of said electrodes is different from the potential of said silver electrode by a positive level or a negative level of 50 mV or greater, said conductive particles are pulverized and previously molded and then sintered.

45. An optical apparatus according to claim 40, wherein the other conductive particles contain carbon.

46. An optical apparatus comprising:
    a pair of electrodes; and
    silver-salt solution placed in contact with said pair of said electrodes between said pair of electrodes,
    wherein at least the surface of either of said pair of electrodes is formed by sintering at least one type of conductive particles,
    wherein at least the surface of either of said electrodes is formed by a sintered layer of conductive particles except for silver used in the previous silver-plate or silver-evaporation, and
    wherein at least the surface of either of said electrodes is formed by previously molding a pulverized conductive material except for silver used in previous silver-plate or silver-evaporation, by previously molding said conductive particles and by sintering said conductive particles.

47. An optical apparatus comprising:

a pair of electrodes; and silver-salt solution placed in contact with said pair of said electrodes between said pair of electrodes, wherein at least the surface of either of said pair of electrodes is formed by sintering at least one type of conductive particles, and wherein the difference between the potential of either of said electrodes and the potential of said silver electrode is 50 mV or lower.

48. An optical apparatus according to claim 40, wherein either of said electrodes incorporates a first conductive layer formed by sintering said conductive particles and a second conductive layer formed below said first conductive layer.

49. An optical apparatus according to claim 48, wherein said second conductive layer is made of metal foil or a thin conductive film.

50. An optical apparatus comprising:

a pair of electrodes; and silver-salt solution placed in contact with said pair of said electrodes between said pair of electrodes, wherein at least the surface of either of said pair of electrodes is formed by sintering at least one type of conductive particles, wherein either of said electrodes incorporates a first conductive layer formed by sintering said conductive particles and a second conductive layer formed below said first conductive layer, and wherein said second conductive layer is made of the same material as that of the other electrode of said pair of electrodes.

51. An optical apparatus comprising:

a pair of electrodes; and silver-salt solution placed in contact with said pair of said electrodes between said pair of electrodes, wherein at least the surface of either of said pair of electrodes is formed by sintering at least one type of conductive particles, and wherein substantially no edge exists at ends of either of said electrodes.

52. An optical apparatus according to claim 40, further comprising a pair of transparent or semi-transparent substrates disposed opposite to each other, at least one pair of transparent or semi-transparent electrodes each of which is provided for each of opposite surfaces of said pair of transparent or semi-transparent substrates such that said pair of transparent or semi-transparent electrodes are disposed opposite to each other, said silver-salt solution placed in contact with said at least one pair of transparent or semi-transparent electrodes such that said silver-salt solution is placed between said at least one pair of transparent or semi-transparent electrodes and a counter electrode disposed in contact with said silver-salt solution and having a structure that at least the surface is formed binder sintering said conductive particles.

53. An optical apparatus according to claim 52, wherein said transparent or semi-transparent electrode is made of indium-tin oxide.

54. An optical apparatus according to claim 52, wherein said counter electrode formed by sintering said conductive particles is formed along the outer peripheries of said pair of transparent or semi-transparent electrode.

55. An optical apparatus according to claim 54, wherein said pair of transparent or semi-transparent electrode are disposed apart from each other for a predetermined distance by a spacer formed along the outer peripheries, and said counter electrode formed by sintering said conductive particles is formed on the inner surface of said spacer.

56. An optical apparatus according to claim 54, wherein said pair of transparent or semi-transparent electrodes are disposed apart from each other for a predetermined distance by a spacer formed along the outer peripheries, and said spacer is made to be said counter electrode formed by sintering said conductive particles.

* * * * *